US009423271B1

(12) United States Patent
Bell

(10) Patent No.: US 9,423,271 B1
(45) Date of Patent: Aug. 23, 2016

(54) GLIDE PATH INFORMATION GENERATING AND PRESENTING DEVICE AND METHODS

(71) Applicant: Rockwell Collins, Inc., Cedar Rapids, IA (US)

(72) Inventor: Douglas A. Bell, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 256 days.

(21) Appl. No.: 13/788,424

(22) Filed: Mar. 7, 2013

(51) Int. Cl.
*G01C 23/00* (2006.01)
*G06G 7/72* (2006.01)

(52) U.S. Cl.
CPC ..................... *G01C 23/00* (2013.01)

(58) Field of Classification Search
CPC combination set(s) only.
See application file for complete search history.

(56) References Cited

U.S. PATENT DOCUMENTS

| 4,032,920 | A | * | 6/1977 | Martin et al. | 342/413 |
| 7,209,053 | B2 | | 4/2007 | Gannon | |
| 7,216,069 | B2 | * | 5/2007 | Hett | G01C 23/005 340/972 |
| 7,772,994 | B2 | | 8/2010 | He | |
| 8,060,262 | B2 | | 11/2011 | Burgin et al. | |
| 2008/0169941 | A1 | * | 7/2008 | He | 340/971 |

OTHER PUBLICATIONS

Federal Aviation Administration; Aeronautical Information Manual; 2012; pp. 2-1-1 through 2-1-6.
Federal Aviation Administration; Pilot's Handbook of Aeronautical Knowledge; 2008; pp. 13-7 & 13-8.
Federal Aviation Administration; Airworthiness Approval of Enhanced Vision System, Synthetic Vision System, Combined Vision System, and Enhanced Flight Vision System Equipment, Advisory Circular ("AC") 20-167, Jun. 22, 2010, pp. 8-10, 21-25, A3-3-A3-4, & A8-3.
Instrument Flying Handbook, 1971, pp. 122-128, AC 61-27B, Department of Transportation, F.A.A., Flight Standards Service, Oklahoma City, OK.
Instrument Flying Handbook, 2012, pp. 9-35-9-38, FAA-H-8083-15B, Department of Transportation, F.A.A., Airman Testing Standards Branch, Oklahoma City, OK.

* cited by examiner

*Primary Examiner* — Fekadeselassie Girma
*Assistant Examiner* — Cal Eustaquio
(74) *Attorney, Agent, or Firm* — Daniel M. Barbieri; Donna P. Suchy; Angel N. Gerdzhikov

(57) ABSTRACT

A present novel and non-trivial system and methods for generating and presenting glide path information are disclosed. A symbology generator may be configured to receive first data representative of a desired glide path ("DGP"); receive second data representative of first glide path deviation or third data representative of at least aircraft position; determine second glide path deviation as a function of the DGP and the aircraft position if the second data is not received; and generate symbology data as a function of the DGP and the first glide path deviation or second glide path deviation, where the symbology data is representative of a glide path angle reference cue comprised of a desired glide path deviation indicator. The desired glide path deviation indicator may be comprised of a single geometric symbol or a pattern of a plurality of geometric symbols.

24 Claims, 18 Drawing Sheets

FIG. 10A
   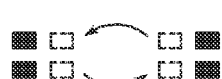   
FIG. 10B    FIG. 10C    FIG. 10D
FIG. 11A
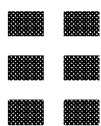      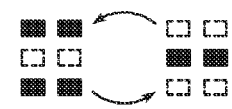
FIG. 11B    FIG. 11C    FIG. 11D
FIG. 12A
      
FIG. 12B    FIG. 12C    FIG. 12D

GLIDE PATH INFORMATION GENERATING AND PRESENTING DEVICE AND METHODS

BACKGROUND OF THE INVENTION

1. Field of the Invention

This invention pertains generally to the field of aircraft display units.

2. Description of the Related Art

Airports employ lighting aids to assist the pilot when, for instance, approaching a runway to land. According to the Aeronautical Information Manual ("AIM") published by the Federal Aviation Administration ("FAA") of the United States ("US"), a Visual Approach Slope Indicator ("VASI") may be comprised on either two, four, six, twelve, or sixteen light units referred to as near, middle, and far bars. Most VASI installations are consists of two bars—near and far bars—and may consist of two, four, or twelve light units. Some VASIs consist of three bars—near middle, and far bars—which provide an additional visual glide slope to accommodate high cockpit aircraft. This installation may consist of either six or sixteen light units. VASI installations consisting of two, four, or six light units are located on one side of the runway, usually the left. Where the installation consists of 12 or 16 light units, the units are located on both sides of the runway.

Referring to FIGS. 1A through 1C herein and as stated in the AIM, two-bar VASI installations provide one visual glide slope which is normally set at 3 degrees (FIG. 1A). Three-bar VASI installations provide two visual glide slopes (FIG. 1B). The lower glide slope is provided by the near and middle bars and is normally set at three degrees while the upper glide slope, provided by the middle and far bars, is normally one-quarter degree higher. This higher glide slope is intended for use only by high cockpit aircraft to provide efficient threshold crossing height. Although normal glide slope angles are three degrees, angles at some locations may be as high as four-and-a-half degrees to give proper obstacle clearance. Pilots of high-performance aircraft are cautioned that the use of VASI angles in excess of three-and-a-half degrees may cause an increase in runway length required for landing and rollout.

The basic principle of the VASI is that of color differentiation between red and white. Each light unit projects a beam of light having a white segment in the upper part of the beam and a red segment in the lower part. The light units are arranged so that the pilot using the VASIs during an approach will see the combination of lights as shown in FIGS. 1A through 1C.

The VASI is a system of lights so arranged to provide visual descent guidance information during the approach to a runway. These lights are visible from three to five miles during the day and up to twenty times or more at night. The visual glide slope of the VASI provides safe obstruction clearance within plus or minus ten degrees of the extended runway centerline and to four nautical miles from the runway threshold. Using a VASI, descent should not be initiated until the aircraft is visually aligned with the runway. Lateral course guidance is provided by the runway or runway lights. In certain circumstances, the safe obstruction clearance area may be reduced due to local limitations, or the VASI may be offset from the extended runway centerline.

Referring to FIG. 1D, a Precision Approach Path Indicator ("PAPI") uses light units similar to the VASI but are installed in a single row of either two or four light units. These light are visible from about five miles during the day and up to twenty miles at night. The visual glide slope of the PAPI typically provides safe obstruction clearance within plus or minus ten degrees of the extended centerline and to 4 statute miles from the runway threshold. Using the PAPI, descent should not be initiated until the aircraft is visually aligned with the runway. The row of lights is normally installed on the left side of the runway and the path indications are shown in FIG. 1D. Lateral course guidance is provided by the runway or runway lights. In certain circumstances, the safe obstruction clearance area may be reduced due to local limitation, or the PAPI may be offset from the extended runway centerline.

Referring to FIG. 1E, tri-color visual approach slope indicators normally consist of a single light unit projecting a three-color visual approach path into the final approach area of the runway upon which the indicator is installed. The below glide slope indication is red, the above glide slope indication is amber, and the on glide slope indication is green. These types of indicators have a useful range of approximately one-half to one mile during the day and up to five miles at night depending upon the visibility conditions.

Referring to FIG. 1F, pulsating visual approach slope indicators normally consist of a single light unit projecting a two-color visual approach path into the final approach area of the runway upon which the indicator is installed. The on glide slope indication is a steady white light. The slightly below glide slope indication is a steady red light. If the aircraft descends further below the glide slope, the red light starts to pulsate. The above glide slope indication is a pulsating white light. The pulsating increases as the aircraft gets further above or below the desired glide slope. The useful range of the system is about four miles during the day and up to ten miles at night.

In U.S. Pat. No. 7,216,069 entitled "Simulated Visual Glideslope Indicator on Aircraft Display" and dated May 8, 2007, Hett discloses a simulated glide slope indicator displayed in familiar VASI symbology and comprised of an ideal glide slope target, and a variable-positioning pointer within a vertical deviation scale.

In U.S. Pat. No. 7,772,994 entitled "Aircraft Glide Slope Display System and Method" and dated Aug. 10, 2010, Gang He discloses a glide slope icon of a desired glide slope that is comprised of a stationary series of monochromatic geometric symbols. To display deviation therefrom, Gang He discloses a second indicator referred to as a glide slope deviation icon comprised of a variable-positioned series of polychromatic geometric symbols that are off and to the side of the pitch scale of an attitude indicator.

BRIEF SUMMARY OF THE INVENTION

The embodiments disclosed herein present novel and non-trivial system and methods for generating glide path information and presenting such information on a pitch scale of an attitude indicator as a glide path angle reference cue ("GPARC") and a desired glide path deviation indicator ("DGPDI"). With the embodiments disclosed herein, a pilot may look at one reference cue only to determine a glide path deviation.

In one embodiment, a system is disclosed for glide path information. The system may be comprised of a source of a desired glide path data, a source of first glide path deviation data or a source of aircraft position data, and a symbology generator ("SG"). In another embodiment, the system may be further comprised of a display unit(s).

In another embodiment, a device is disclosed for generating glide path information, where such device could be the SG configured to generate symbology data based upon the desired glide path data and either the glide path deviation data received from the applicable source or determined from the navigation data. The symbology data could be representative of a GPARC comprised of a DGPDI. In an additional embodiment, the GPARC could be presented on a pitch scale of an attitude indicator against the background of a three-dimensional perspective of a scene located outside the aircraft.

In another embodiment, a method is disclosed for generating a GPARC, where such method could be performed by the SG. When properly configured, the SG may receive the desired glide path data; receive either first glide path deviation data of the navigation data representative of at least the position of the aircraft; determine a second glide path deviation data if the first glide path deviation data is not received; and generate symbology data as a function the desired glide path and first glide path deviation or second glide path deviation.

BRIEF DESCRIPTION OF THE DRAWINGS

FIG. 6/2 depicts five additional indications of the first exemplary configuration of a GPARC.
FIG. 6/3 depicts three additional indications of the first exemplary configuration of a GPARC.
FIG. 7/2 depicts six additional indications of the second exemplary configuration of a GPARC.
FIG. 7/3 depicts five additional indications of the second exemplary configuration of a GPARC.
FIG. 8/2 depicts six additional indications of the third exemplary configuration of a GPARC.
FIG. 8/3 depicts five additional indications of the third exemplary configuration of a GPARC.
FIG. 10A depicts one indication of a fifth exemplary configuration of a GPARC.
FIG. 10B depicts a second indication of the fifth exemplary configuration of a GPARC.
FIG. 10C depicts a third indication of the fifth exemplary configuration of a GPARC.
FIG. 10D depicts a fourth indication of the fifth exemplary configuration of a GPARC.
FIG. 10A depicts one indication of a fifth configuration of a GPARC.
FIG. 11A depicts one indication of a sixth exemplary configuration of a GPARC.
FIG. 11B depicts a second indication of the sixth exemplary configuration of a GPARC.
FIG. 11C depicts a third indication of the sixth exemplary configuration of a GPARC.
FIG. 11D depicts a fourth indication of the sixth exemplary configuration of a GPARC.
FIG. 12A depicts one indication of a seventh exemplary configuration of a GPARC.
FIG. 12B depicts a second indication of the seventh exemplary configuration of a GPARC.
FIG. 12C depicts a third indication of the seventh exemplary configuration of a GPARC.
FIG. 12D depicts a fourth indication of the seventh exemplary configuration of a GPARC.

DETAILED DESCRIPTION OF THE INVENTION

In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1A:
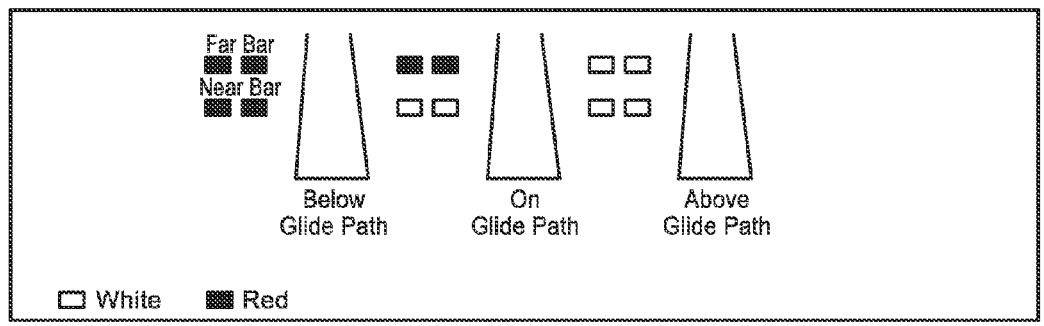
FIG. 1A depicts a two-bar VASI installation.
Figure 1B:
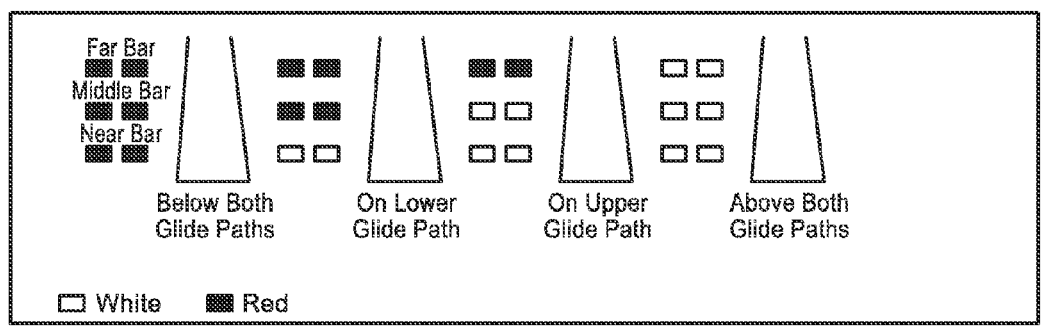
FIG. 1B depicts a three-bar VASI installation.
Figure 1C:
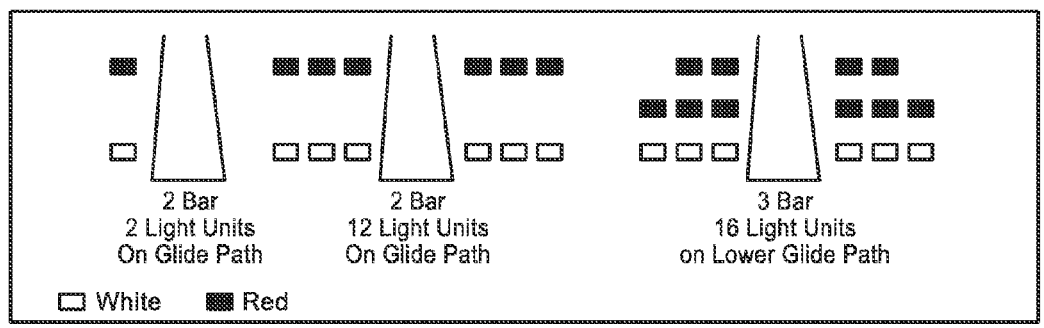
FIG. 1C depicts variation of VASI installations.
Figure 1D:
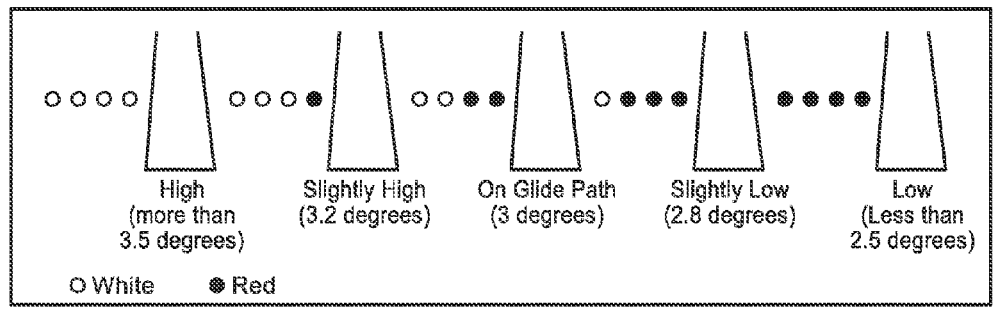
FIG. 1D depicts a PAPI installation.
Figure 1E:
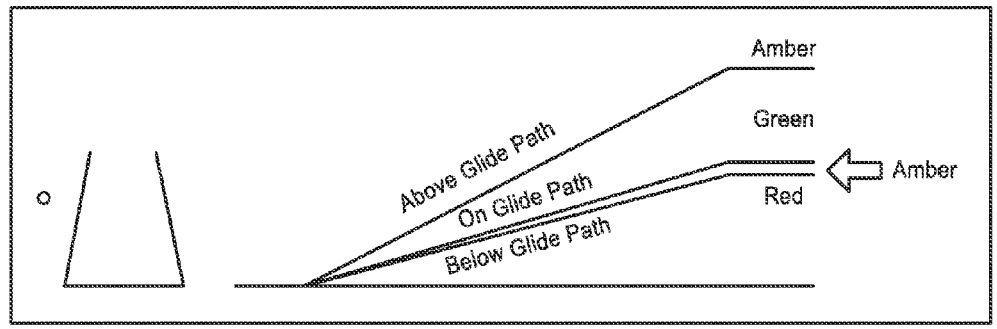
FIG. 1E depicts a tri-color visual approach slope indication installation.
Figure 1F:
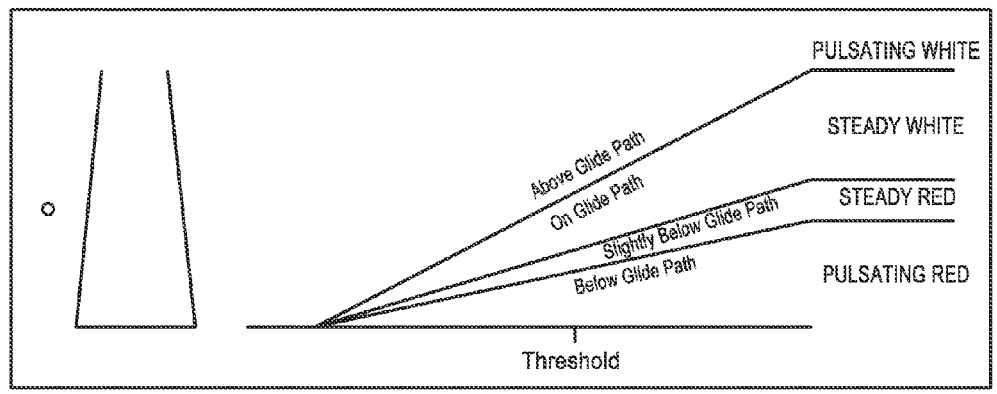
FIG. 1F depicts a pulsating visual approach slope indication installation.
Figure 2:
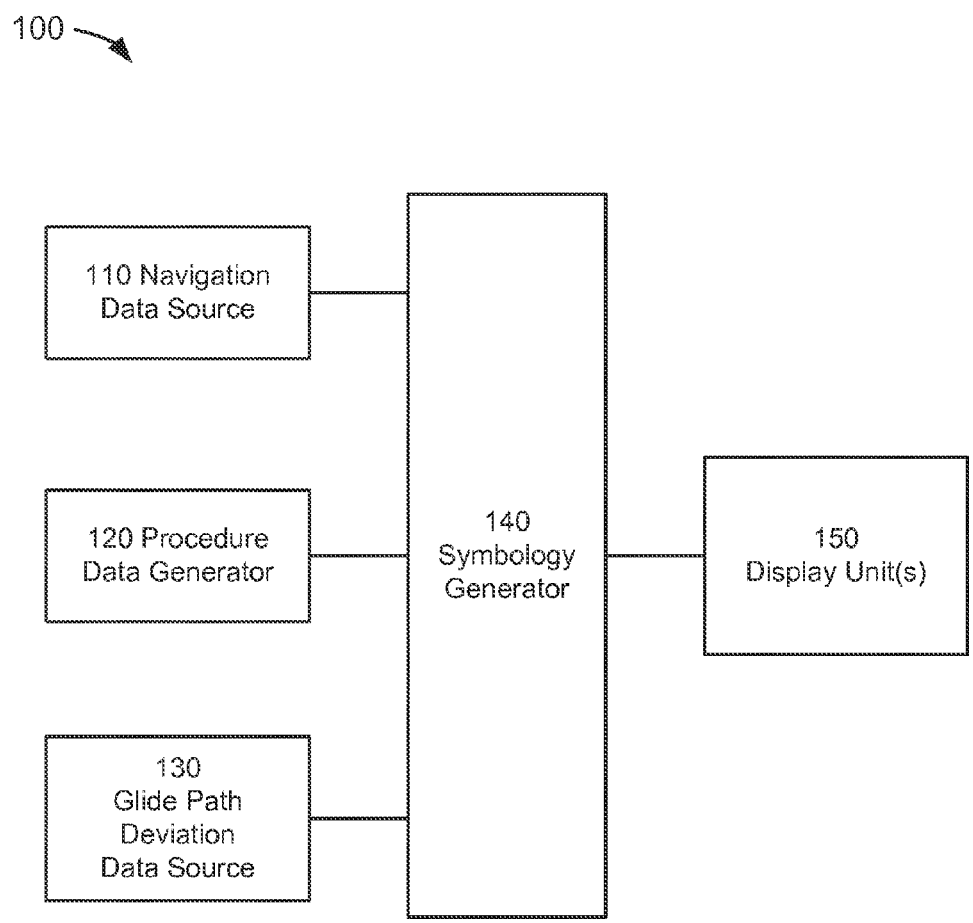
FIG. 2 depicts a block diagram of a system for generating a GPARC.

FIG. 2 depicts a block diagram of a glide path information generating system 100 suitable for implementation of the techniques described herein. The generating system 100 of an embodiment of FIG. 2 may include a navigation data source 110, a procedure data generator ("PDG") 120, a glide path deviation data source 130, a symbology generator ("SG") 140, and display unit(s) 150.

In an embodiment of FIG. 2, the navigation data source 110 could be any system or systems providing navigation data information in an aircraft. It should be noted that data, as embodied herein for any source or system in an aircraft including a navigation system, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

The navigation data source 110 may include, but is not limited to, an air/data system, an attitude heading reference system, an inertial guidance system (or inertial reference system), a global navigation satellite system ("GNSS") (or satellite navigation system), and a flight management system ("FMS"), all of which are known to those skilled in the art. As embodied herein, the navigation system 110 could provide navigation information including, but not limited to, geographic position, altitude, attitude, and speed. As embodied herein, aircraft position may be comprised of geographic position (e.g., latitude and longitude coordinates) and altitude. As embodied herein, navigation data may be provided to the SG 140.

The FMS may be comprised of a navigation database, where the navigation database could be comprised of data associated with ground-based navigational aids, waypoints, holding patterns, airways, airports, heliports, instrument departure procedures, instrument arrival procedures, instrument approach procedures, runways, precision approach aids, company routes, airport communications, localizer and airway markers, restrictive airspace, airport sector altitudes, enroute airways restrictions, enroute communications, preferred routes, controlled airspace, geographical references, arrival and/or departure flight planning, path point records, and/or GNSS Landing Systems. The FMS and the navigation database thereof are known to those skilled in the art.

It should be noted that data contained in any database discussed herein may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature. Any database used in the embodiments disclosed herein may be a stand-alone database or a combination of databases.

In an embodiment of FIG. 2, the PDG 120 may be comprised of any processing unit or combination of processing units programmed for or configured to generate procedure data representative of an approach procedure comprised of, in part, a glide path from which a desired glide path may be ascertained. One example of the PDG 120 is the processor disclosed by Barber in U.S. Pat. No. 8,234,058 entitled "System, Module, and Method for Generating Procedure Data Used in an Avionics System" and dated Jul. 31, 2012, which is hereby incorporated by reference in its entirety. As embodied herein, the procedure data generated by the PDG 120 may be provided to the SG 140.

In an embodiment of FIG. 2, the glide path deviation data source 130 could be comprised of any device known to those skilled in the art for measuring the angular deviation between an aircraft and a desired glide path to a runway. One example of the glide path deviation data source 130 may be an ILS deviation data source. The ILS deviation data source could be an ILS receiver installed in an aircraft that is linked to a localizer antenna and a glide slope antenna. The ILS receiver could be configured for receiving and demodulating localizer and glide slope signals propagated by ground-based localizer and glide slope transmitters. After the signals have been demodulated, ILS receiver data representative of, in part, glide slope deviation information may be generated by the ILS receiver and provided to the SG 140 as glide path deviation information.

Another example of the glide path deviation data source 130 may be deviation data derived by another system besides the ILS system that is installed in an aircraft that is part of an instrument approach procedure for which vertical navigation is provided such as, but not limited to, a localizer performance with vertical guidance ("LPV") approach procedure, a global positioning system ("GPS") approach procedure, barometric vertical navigation ("baro VNAV") deviation data source. Glide path deviation information may be generated by one or more of these sources and provided to the SG 140.

In an embodiment of FIG. 2, the SG 140 and the PDG 120 may be comprised of any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The SG 140 and/or the PDG 120 may be driven by the execution of software or computer instruction code containing algorithms developed for the specific functions embodied herein. The SG 140 and/or the PDG 120 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the SG 140 and/or the PDG 120 could be a processor(s) used by or in conjunction with any other system of the aircraft including, but not limited to, the navigation data source 110, the glide path deviation data source 130, the display units 150, or any combination thereof.

The SG 140 may be programmed or configured to receive as input data representative of information obtained from various systems and/or sources including, but not limited to, the navigation data source 110, the PDG 120, and the glide path deviation data source 130. As embodied herein, the terms "programmed" and "configured" are synonymous. The SG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The SG 140 may be programmed or configured to execute one or both of the methods discussed in detail below. The SG 140 may be programmed or configured to provide output data to various systems and/or units including, but not limited to, the display units 150.

In an embodiment of FIG. 2, the display unit(s) 150 could be comprised of any unit which may present the pilot with visual information or indications regarding the aircraft attitude information including, but not limited to, a glide path angle reference cue ("GPARC"). The display unit(s) 150 could be comprised of, but not limited to, a Primary Flight Director, Navigation Display, Head-Down Display ("HDD"), Head-Up Display ("HUD"), Multipurpose Control Display Unit, Engine Indicating and Crew Alerting System, Electronic Centralized Aircraft Monitor, Multi-Function Display, Side Displays, and Data Link Control Display Unit. As embodied herein, the disclosures may apply to a portable device including, but not limited to, tablets which employ a display unit.

Figure 3A:
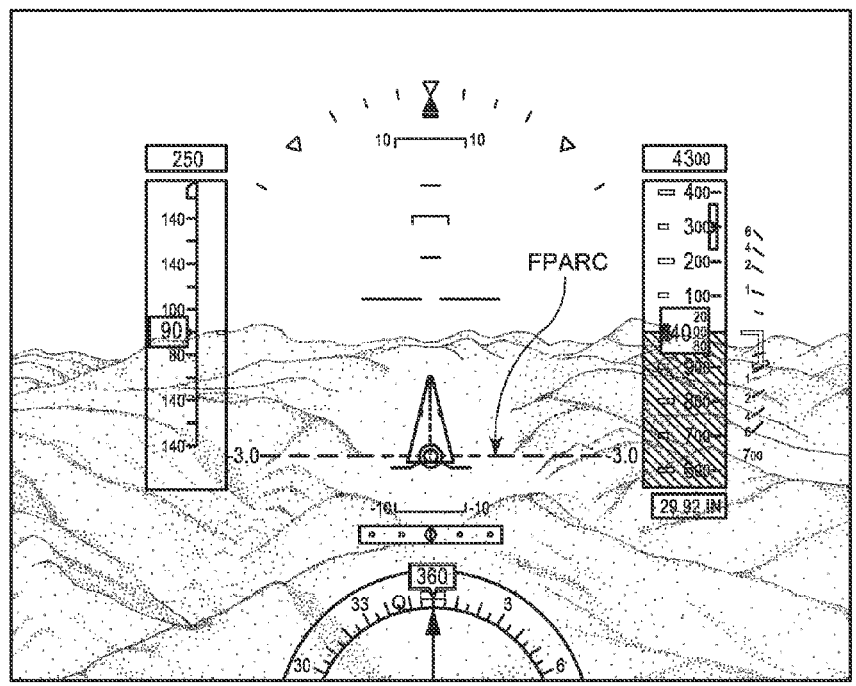
FIG. 3A depicts an exemplary depiction of a Head-Down Display ("HDD").

Referring to FIG. 3A, an exemplary depiction of an HDD for presenting information to the pilot or flight crew against the background of a three-dimensional image of a runway, terrain, and sky is presented; the HDD could be employed as a display unit receiving image data from, but not limited to, an enhanced flight vision system ("EFVS"), an enhanced vision system ("EVS"), a synthetic vision system ("SVS"), and a combined vision system ("CVS"). It should be noted that the information depicted on the HDD (and the HUD of FIG. 3B) has been minimized for the sake of presentation and is not indicative of the plurality of indications or information with which it may be configured.

Figure 3B:
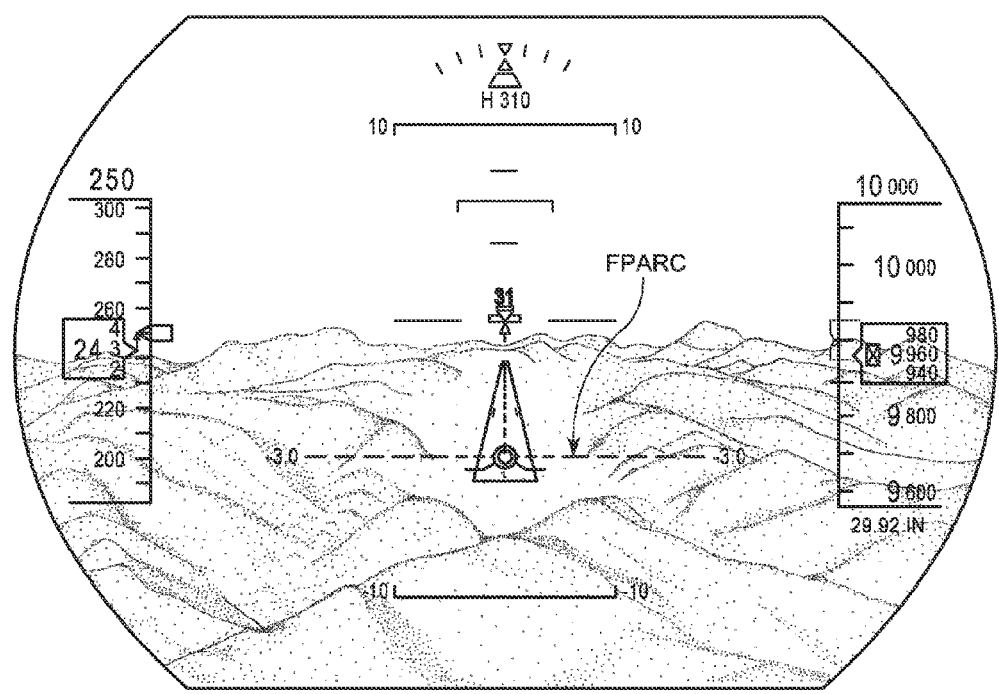
FIG. 3B depicts an exemplary depiction of a Head-Up Display ("HUD").

Referring to FIG. 3B, an exemplary depiction of a HUD for presenting information to the pilot or flight crew against the background of a three-dimensional image of a runway, terrain, and sky is provided; a HUD could be employed as display unit in an EFVS, an EVS, an SVS or a CVS. The three-dimensional image presented on the HUD may be comprised of a lighted solid image formed by varying the brightness of a single color by a method disclosed by VanDerKamp et al in U.S. Pat. No. 8,264,498 entitled "System, Apparatus, and Method for Presenting a Monochrome Image of Terrain on a Head-Up Display Unit and dated Dec. 11, 2012, which is hereby incorporated by reference in its entirety. Because the indications or information shown in FIGS. 3A and 3B are known to those skilled in the art, a discussion of the specific information shown is not provided herein.

Figure 4A:
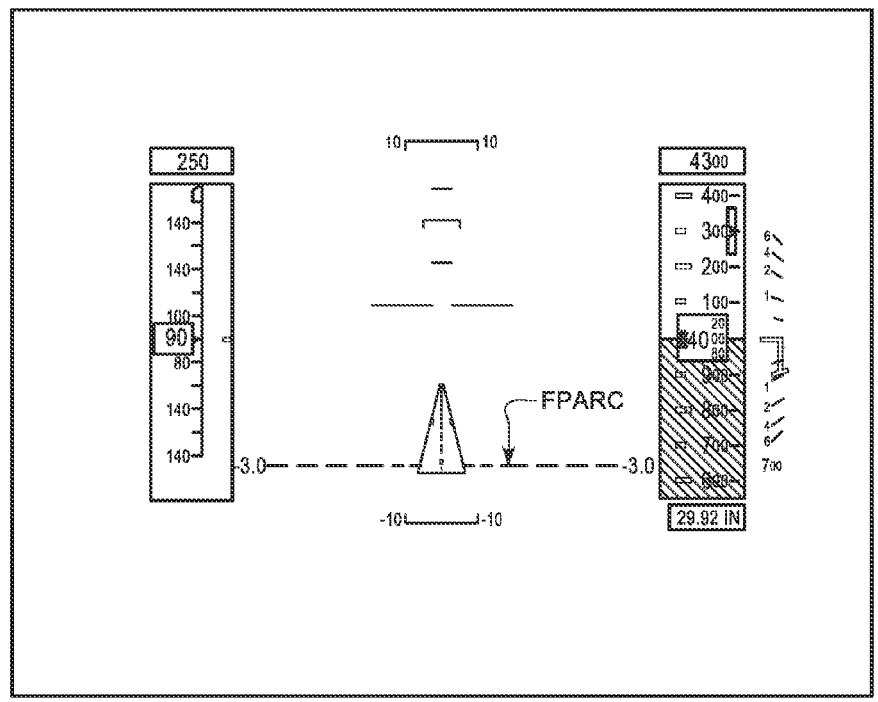
FIG. 4A depicts the HDD of FIG. 3A without some of the symbology.
Figure 4B:
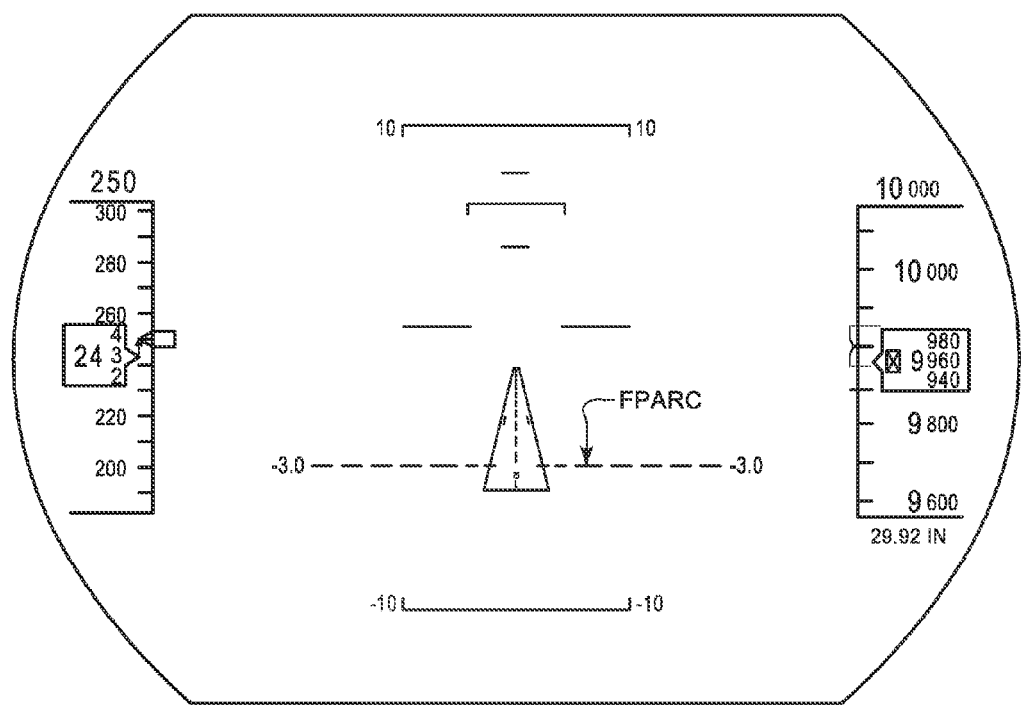
FIG. 4B depicts the HUD of FIG. 3B without some of the symbology.

As shown in FIGS. 3A and 3B, a flight path angle reference cue ("FPARC") is presented on a pitch scale of an attitude indicator (not to scale) that is depicted on the HDD and HUD, respectively, along with other various symbologies as presented against the background of the three-dimensional image. Referring to FIGS. 4A and 4B, the FPARCs are presented on a pitch scale of an attitude indicator on the HDD and HUD of FIGS. 3A and 3B but without other symbology. Although it is the term that is currently being used in published references, the FPARC may be comprised of any cue on the pitch scale of an attitude indicator displaying a desired approach angle (i.e., desired flight path angle). The FPARC may provide the pilot with a vertical path reference; moreover, when the aircraft is operating under an instrument approach procedure providing vertical guidance or under one in which vertical guidance is not available, the FPARC may provide the pilot with the primary vertical path reference. Disclosed as a series of monochromatic geometric symbols, the generation of FPARC symbology is known to those skilled in the art. For example, the FPARC is referred to as a "glide slope icon" by Gang He in U.S. Pat. No. 7,772,994 entitled "Aircraft Glide Slope Display System and Method" and dated Aug. 10, 2010.

The FPARC is discussed in at least two reference published by the Federal Aviation Administration ("FAA") of the United States ("US"): the Aeronautical Information Manual ("AIM") dated Feb. 9, 2012 incorporating Change 1 dated Jul. 26, 2012, and Advisory Circular ("AC") 20-167 entitled "Airworthiness Approval of Enhanced Vision System, Synthetic Vision System, Combined Vision System, and Enhanced Flight Vision System" dated Jun. 22, 2010. Although the AIM and AC 20-167 discuss the FPARC in the context of what is currently referred to as an EFVS, the embodiments disclosed herein are not limited to the EFVS but may be employed by other vision systems including, but not limited to, an EVS, an SVS, and a CVS. In addition, although these references discuss the FPARC in the context a HUD, the embodiments disclosed herein are not limited to the HUD.

The advantages and benefits of the embodiments discussed herein may be illustrated by showing examples depicting exemplary symbologies of a GPARC comprised of a DGPDI and based upon a desired glide path ("DGP") and deviation from that DGP. Although the GPARC may be similar to an FPARC stated in at least AC 20-167, the embodiments herein are not limited to being a manually-selectable cue. Moreover, the glide path as embodied herein includes the approach path of AC 20-167. With the embodiments stated herein, a manufacturer and/or end-user has the ability to include an option permitting a manual selection of the GPARC and/or limiting the GPARC to being set manually only; such as action could be taken to meet a regulatory requirement(s). In the following paragraphs, these examples are provided to illustrate the ability with which a manufacturer or end-user may configure the presentation of a DGPDI. Because these are examples, they are not intended to provide or convey a limitation to the embodiments discussed herein in any way, shape, or form.

Figure 5A:
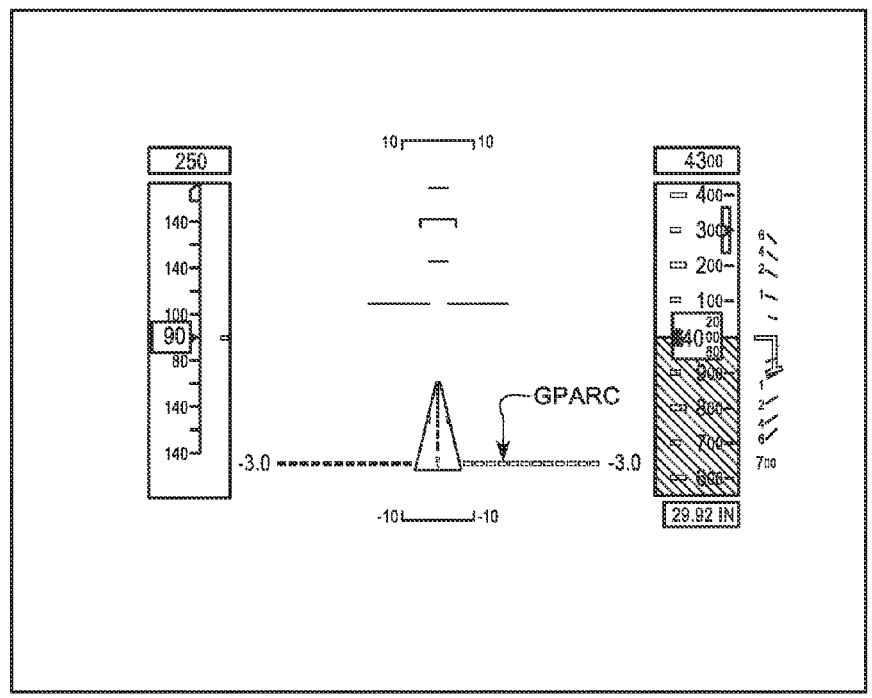
FIG. 5A depicts an exemplary configuration of the disclosed GPARC when presented on the HDD of FIG. 4A.
Figure 5B:
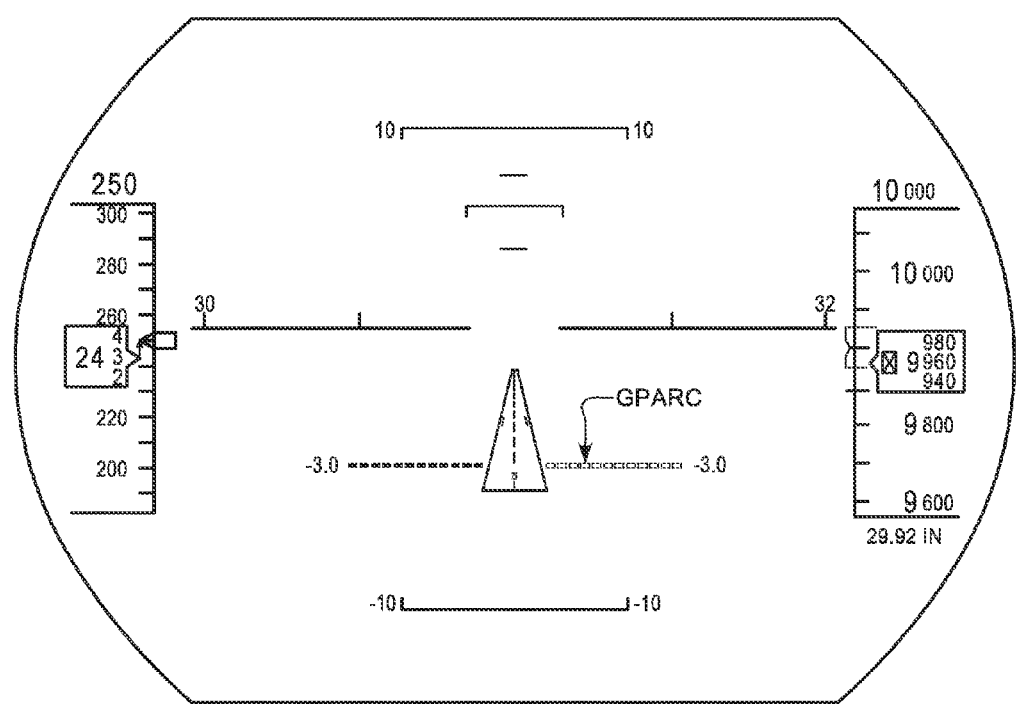
FIG. 5B depicts an exemplary configuration of the disclosed GPARC when presented on the HUD of FIG. 4B.

Referring to FIGS. 5A and 5B, the DGPDI of a GPARC comprised of a plurality of geometric symbols is presented on a pitch scale of an attitude indicator (not to scale) that is depicted on the HDD and HUD, respectively. For the purpose of illustration only, the DGP will be set to −3.0 degrees. Each image could be generated by a vision system(s) such as an EFVS, an EVS, an SVS, and/or CVS. Because the following discussion will be drawn to a DGPDI comprised of geometric symbol(s) having red and white colors, red colors may appear as lighted on the HUD and white colors may appear as transparent. If terrain is presented on the HUD such as the lighted terrain shown in FIG. 3B, an additional symbol encompassing lighted or transparent geometric symbols of the DGPDI and superimposed against the terrain may be necessary so that the geometric symbols are made visibly conspicuous to the pilot.

Figure 6:
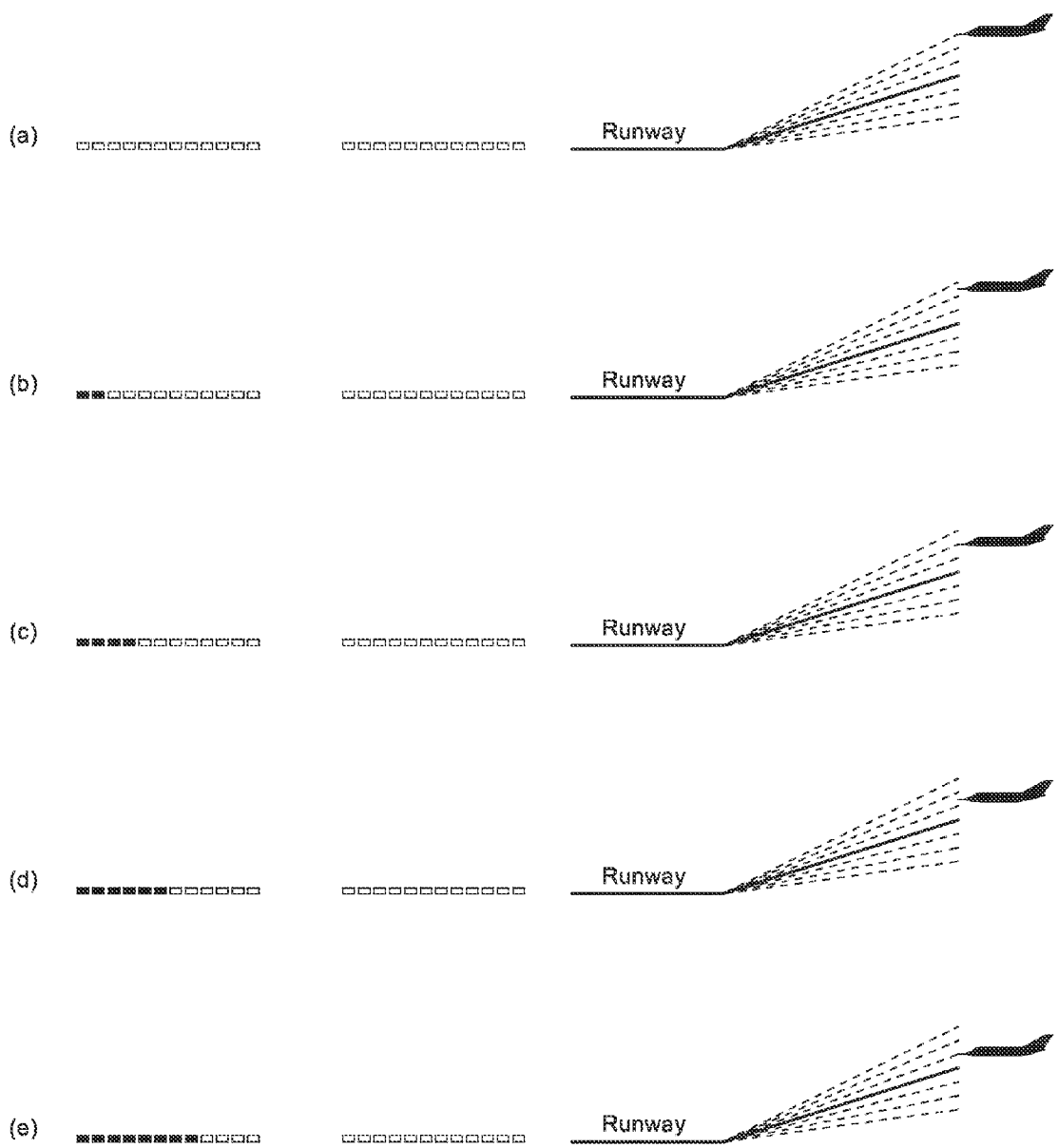
FIG. 6/1 depicts five indications of a first exemplary configuration of a GPARC.
Figure 6:
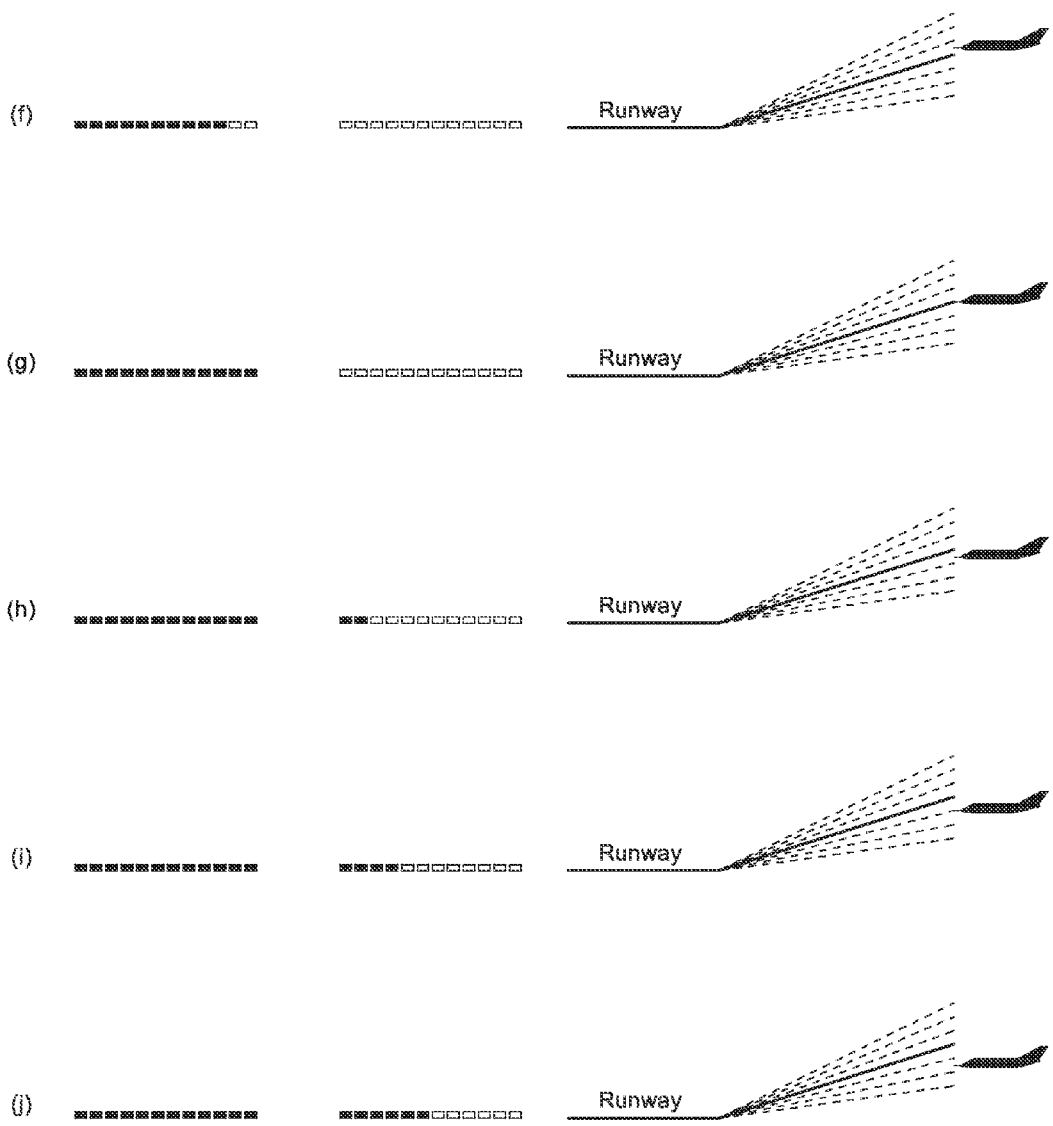
Figure 6:
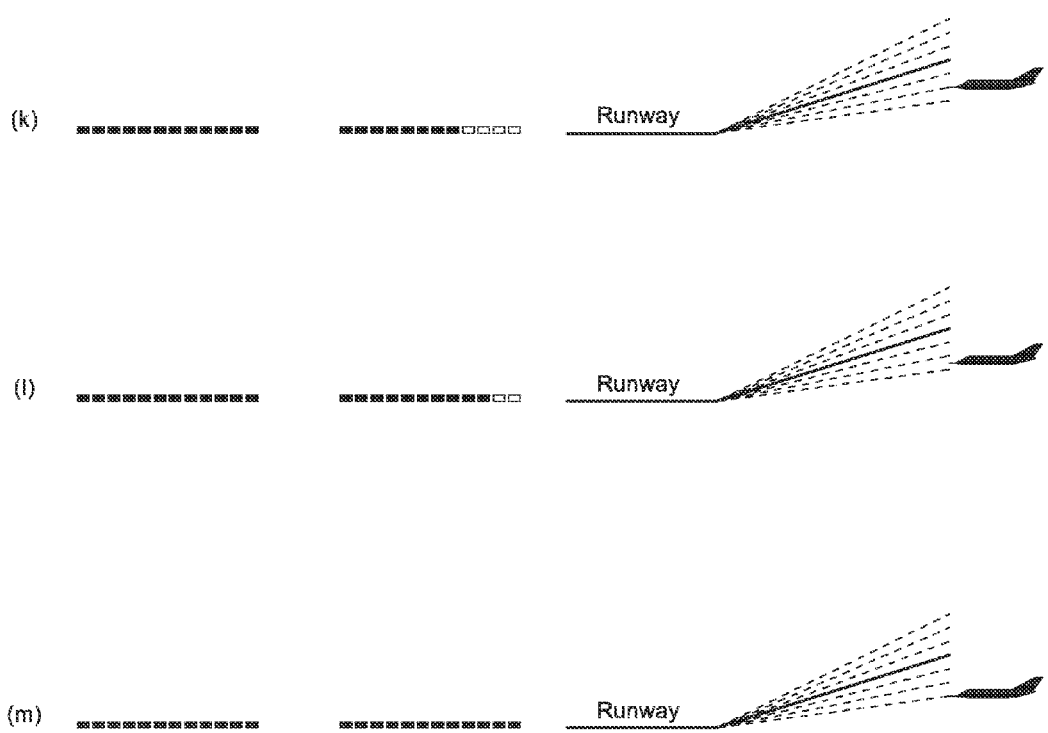

Referring to all of the drawings of FIG. 6, it will be assumed that a manufacturer and/or end-user have configured the DGPDI as a pattern of geometric symbols, that is, a pattern of rectangles lined up in a row. It should be noted that, although the discussion herein will be drawn to geometric symbols comprised of rectangles, the embodiments disclosed herein may include other geometric symbols such as, but not limited to, lines, circles, squares, and any other symbol which the manufacturer and/or end-user may consider as appropriate. As shown in all of the drawings of FIGS. 6 through 8, the DGPDIs are presented on the left and profiles of glide paths are presented on the right; the DGP is shown as a solid line.

As shown in all of the drawings of FIG. 6, the manufacturer and/or end-user has configured the DGPDI to produce twenty-five different indications of glide path deviations ranging from +0.6 degrees to −0.6 degrees, inclusive, producing deviation indications at 0.05 degrees intervals. It should be noted that the number of indications and the range have been selected for the purpose of illustrating a level of deviation indicating precision only and not of limitation.

Referring to FIG. 6(a), the deviation of the glide path from the DGP is +0.6 degrees; as such, each of the twenty-four geometric symbols are white (as indicated by the sixteen unfilled rectangles) when presented on a polychromatic HDD. When presented on a monochromatic HUD, the "white" symbols could appear as a symbol with a "transparent" fill.

In FIG. 6(b), the deviation of the glide path is +0.5 degrees; as such, two of the geometric symbols are now red (as indicated by the filled rectangle) and the other twenty-two are white when presented on a polychromatic HDD. When presented on a monochromatic HUD, the "red" symbols could appear as a symbol with a "lighted" fill. Although the remaining discussion will be drawn towards a polychromatic display, the embodiments disclosed herein include a monochromatic display. It should be noted that, although the remainder of the discussion will be drawn towards the color of red and white, the embodiments disclosed herein are not limited to these two colors. Instead, a manufacturer and/or end-user may employ any suitable or appropriate color or combination of colors.

In FIG. 6(c), the deviation of the glide path is +0.4 degrees, resulting in four red geometric symbols and twenty white.

In FIG. 6(d), the deviation of the glide path is +0.3 degrees, resulting in six red geometric symbols and eighteen white.

In FIG. 6(e), the deviation of the glide path is +0.2 degrees, resulting in eight red geometric symbols and sixteen white.

In FIG. 6(f), the deviation of the glide path is +0.1 degrees, resulting in ten red geometric symbols and fourteen white.

In FIG. 6(g), the deviation of the glide path of aircraft is 0.0 degrees, resulting in twelve red geometric symbols and twelve white. In this configuration, an equal number of white and red geometric symbols is indicative of an aircraft that is on (or near) the DGP.

In FIG. 6(h), the deviation of the glide path is −0.1 degrees, resulting in fourteen red geometric symbols and ten white.

In FIG. 6(i), the deviation of the glide path is −0.2 degrees, resulting in sixteen red geometric symbols and eight white.

In FIG. 6(j), the deviation of the glide path is −0.3 degrees, resulting in eighteen red geometric symbols and six white.

In FIG. 6(k), the deviation of the glide path is −0.4 degrees, resulting in twenty red geometric symbols and four white.

In FIG. 6(l), the deviation of the glide path is −0.5 degrees, resulting in twenty-two red geometric symbols and two white.

In FIG. 6(o), the deviation of the glide path is −0.6 degrees, resulting in twenty-four red geometric symbols.

From the preceding discussion of this configuration of the DGPDI, there will be a sequential growth in the presence of red "lights" for an aircraft descending through the DGP from a deviation of +0.6 degrees to a deviation of −0.6 degrees; likewise, there will be a sequential subsidence in the presence of red "lights" for an aircraft climbing through the DGP from a deviation of −0.6 degrees to a deviation of +0.6 degrees.

Figure 7:
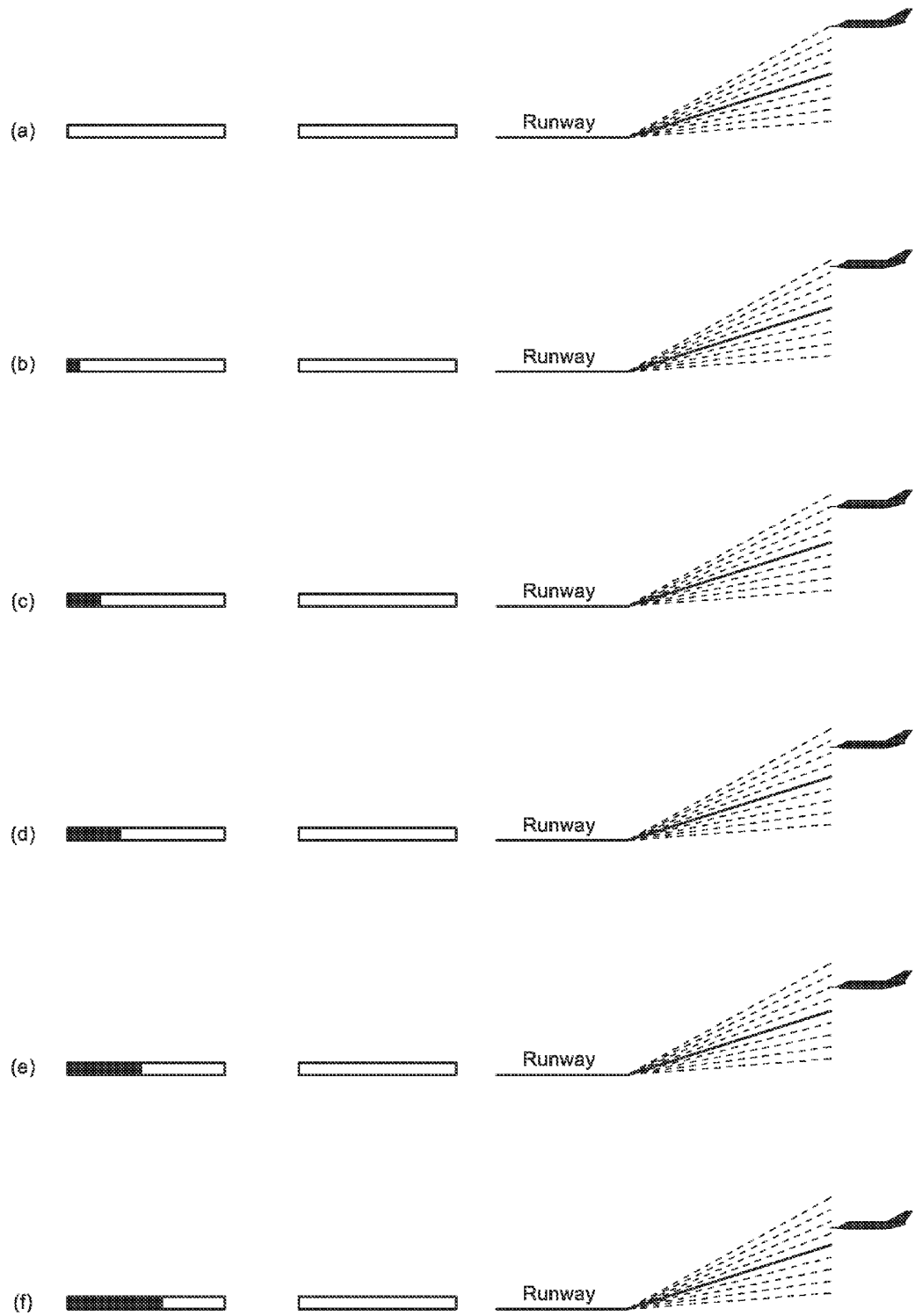
FIG. 7/1 depicts six indications of a second exemplary configuration of a GPARC.
Figure 7:
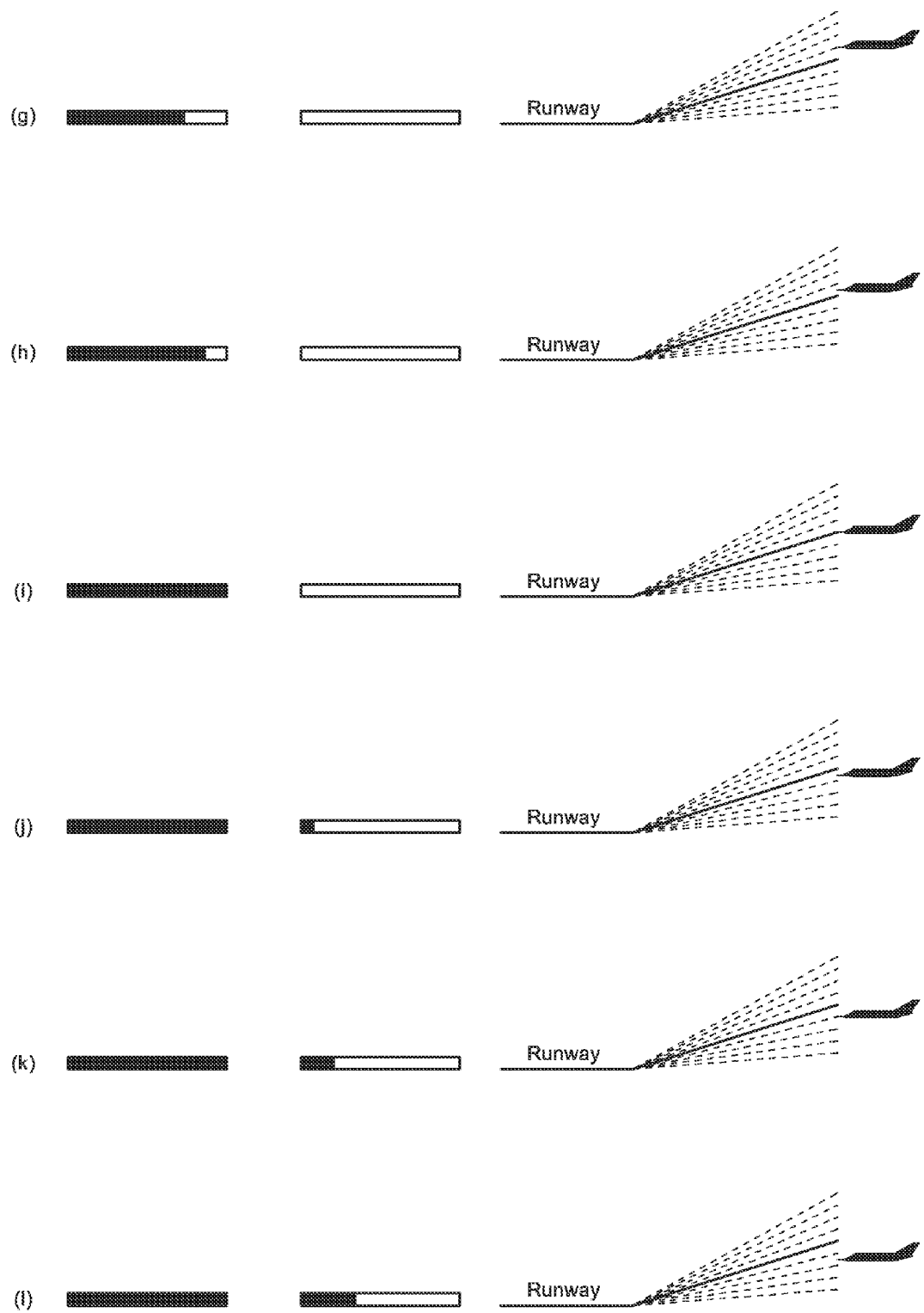
Figure 7:
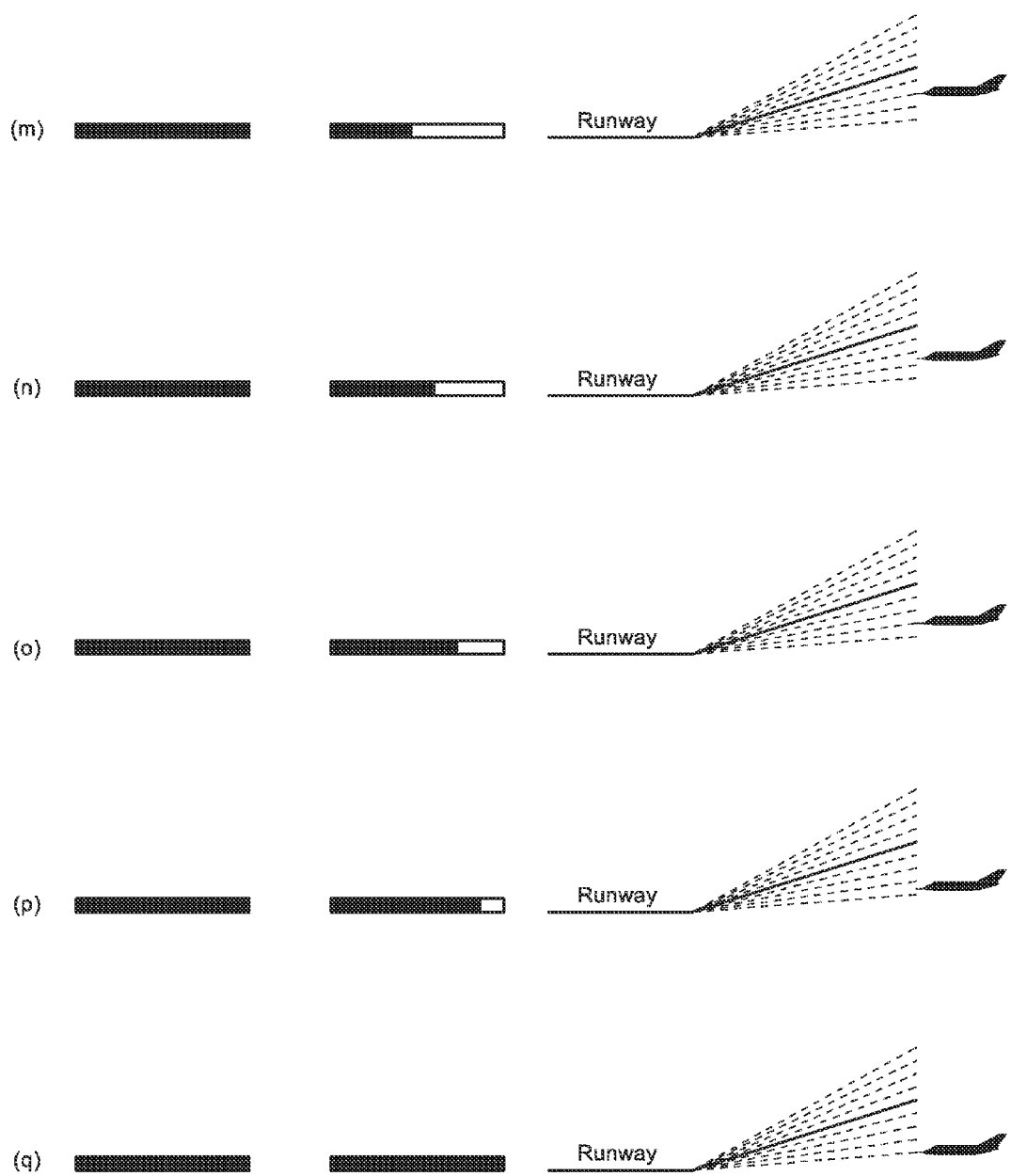

Referring to all of the drawings of FIG. 7, it will be assumed that a manufacturer and/or end-user have configured the DGPDI as a pattern of geometric symbols, that is, a pattern of two rectangles lined up in a row. As shown in all of the drawings of FIG. 7, the manufacturer and/or end-user has configured the DGPDI to produce indications of glide path deviations ranging from +0.8 degrees to −0.8 degrees, inclusive.

Referring to FIG. 7(a), the deviation of the glide path from the DGP is +0.8 degrees; as such, both geometric symbols are white.

In FIG. 7(b), the deviation of the glide path is +0.7 degrees; as such, the geometric symbols to the left is one-eighth red and seven-eighths white, and the other one remains white.

In FIG. 7(c), the deviation of the glide path is +0.6 degrees, resulting in a left geometric symbol that is two-eighths red and six-eighths white, i.e., one-quarter red and three-quarters white.

In FIG. 7(d), the deviation of the glide path is +0.5 degrees, resulting in a left geometric symbol that is three-eighths red and five-eighths white.

In FIG. 7(e), the deviation of the glide path is +0.4 degrees, resulting in a left geometric symbol that is four-eighths red and four-eighths white, i.e., one-half red and one-half white.

In FIG. 7(f), the deviation of the glide path is +0.3 degrees, resulting in a left geometric symbol that is five-eighths red and three-eighths white.

In FIG. 7(g), the deviation of the glide path is +0.2 degrees, resulting in a left geometric symbol that is six-eighths red and two-eighths white, i.e., three-quarters red and one-quarter white.

In FIG. 7(h), the deviation of the glide path is +0.1 degrees, resulting in a left geometric symbol that is seven-eighths red and one-eighth white.

In FIG. 7(i), the deviation of the glide path is +0.0 degrees, resulting in a left geometric symbol that is completely white. In this configuration, an equal number of white and red geometric symbols (i.e., one white geometric symbol and one red geometric symbol) is indicative of an aircraft that is on (or near) the DGP.

In FIG. 7(j), the deviation of the glide path from the DGP is −0.1 degrees; as such, the left geometric symbol is red and the right is one-eighth red and seven-eighths white.

In FIG. 7(k), the deviation of the glide path is −0.2 degrees, resulting in a right geometric symbol that is two-eighths red and six-eighths white, i.e., one-quarter red and three-quarters white.

In FIG. 7(l), the deviation of the glide path is −0.3 degrees, resulting in a right geometric symbol that is three-eighths red and five-eighths white.

In FIG. 7(m), the deviation of the glide path is −0.4 degrees, resulting in a right geometric symbol that is four-eighths red and four-eighths white, i.e., one-half red and one-half white.

In FIG. 7(n), the deviation of the glide path is −0.5 degrees, resulting in a right geometric symbol that is five-eighths red and three-eighths white.

In FIG. 7(o), the deviation of the glide path is −0.6 degrees, resulting in a right geometric symbol that is six-eighths red and two-eighths white, i.e., three-quarters red and one-quarter white.

In FIG. 7(p), the deviation of the glide path is −0.7 degrees, resulting in a right geometric symbol that is seven-eighths red and one-eighth white.

In FIG. 7(q), the deviation of the glide path is −0.8 degrees, resulting in two red geometric symbols.

From the preceding discussion of this configuration of the DGPDI, there will be a progressive growth in the presence of a left red "tape" for an aircraft descending to the DGP from a deviation of +0.8 degrees and a progressive growth in the presence of a right red "tape" from an aircraft descending from the DGP to a deviation of −0.8 degrees; likewise, there will be a progressive subsidence in the presence of a right red "tape" for an aircraft climbing to the DGP to deviation of −0.8 degrees and a progressive subsidence in the presence of a left red "tape" for an aircraft climbing from the DGP to deviation of +0.8 degrees.

Figure 8:
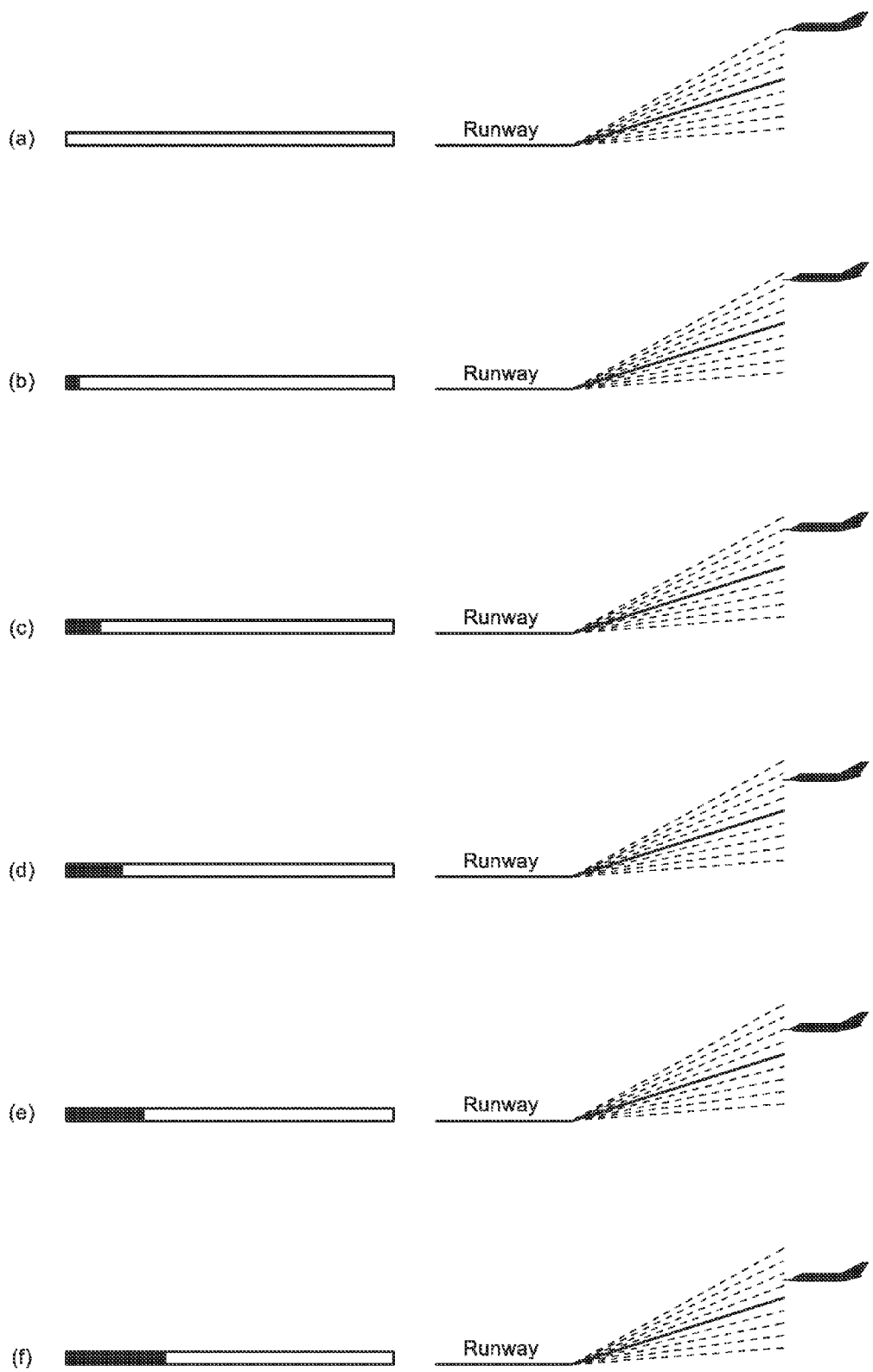
FIG. 8/1 depicts six indications of a third exemplary configuration of a GPARC.
Figure 8:
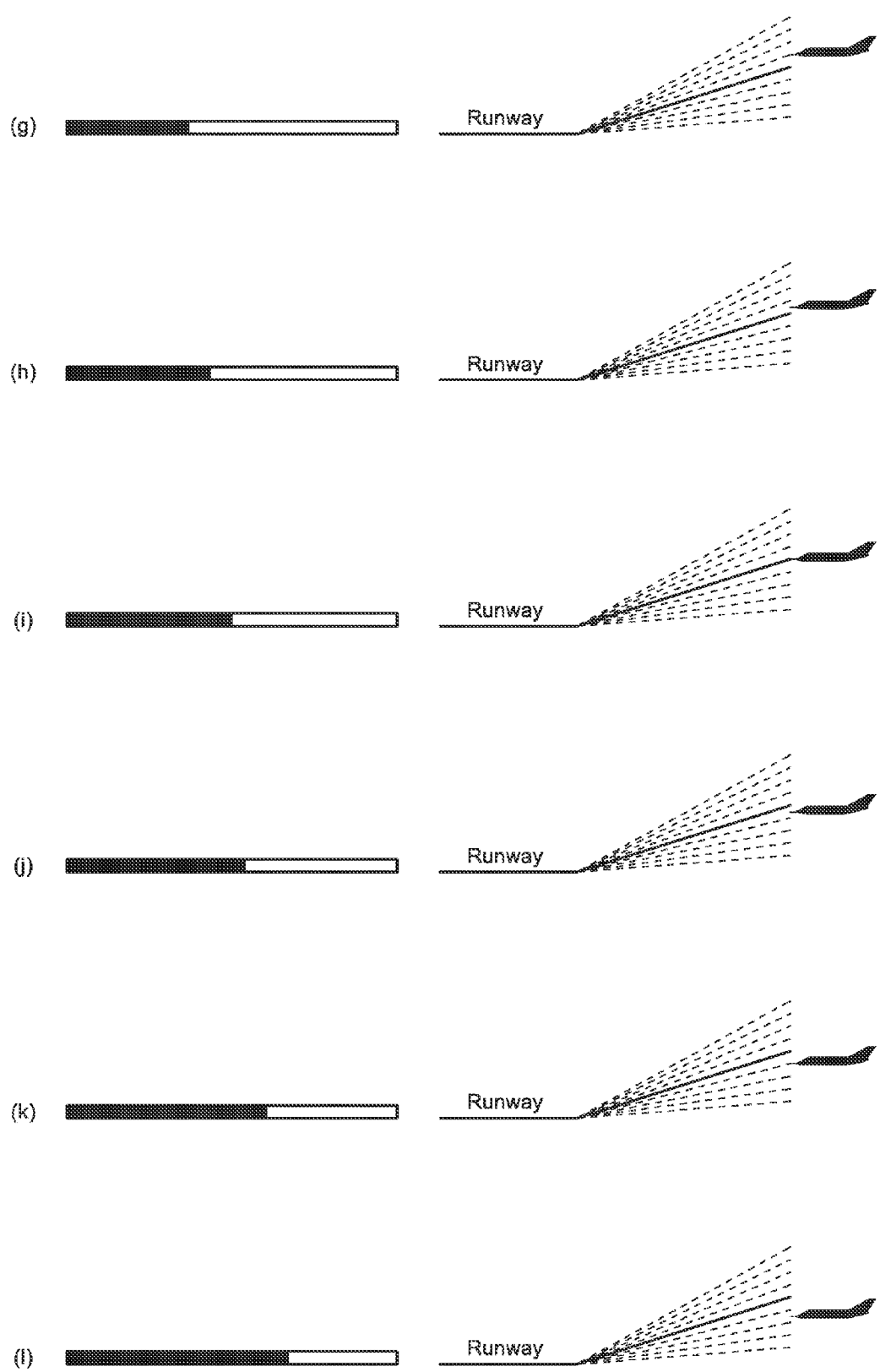
Figure 8:
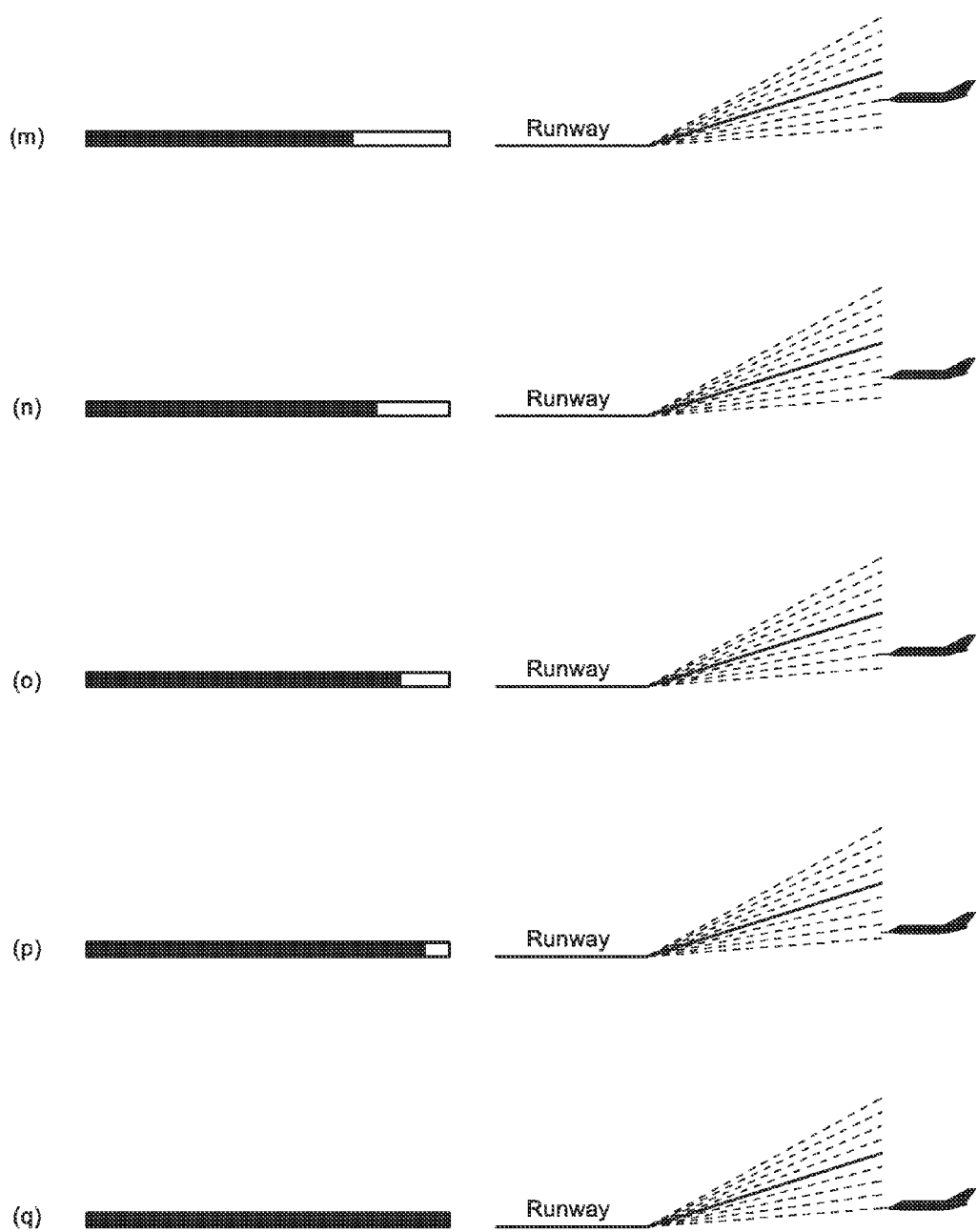

Referring to all of the drawings of FIG. 8, it will be assumed that a manufacturer and/or end-user have configured the DGPDI as a single geometric symbol, that is, one rectangle. As shown in all of the drawings of FIG. 7, the manufacturer and/or end-user has configured the DGPDI to produce indications of glide path deviations ranging from +0.8 degrees to −0.8 degrees, inclusive.

Referring to FIG. 8(a), the deviation of the glide path from the DGP is +0.8 degrees; as such, the geometric symbol is completely white.

In FIG. 8(b), the deviation of the glide path is +0.7 degrees, resulting in a geometric symbol that is one-sixteenth red.

In FIG. 8(c), the deviation of the glide path is +0.6 degrees, resulting in a geometric symbol that is two-sixteenths red, i.e., one-eighth red.

In FIG. 8(d), the deviation of the glide path is +0.5 degrees, resulting in a geometric symbol that is three-sixteenths red.

In FIG. 8(e), the deviation of the glide path is +0.4 degrees, resulting in a geometric symbol that is four-sixteenths red, i.e., one-quarter red.

In FIG. 8(f), the deviation of the glide path is +0.3 degrees, resulting in a geometric symbol that is five-sixteenths red.

In FIG. 8(g), the deviation of the glide path is +0.2 degrees, resulting in a geometric symbol that is six-sixteenths red, i.e., three-eighths red.

In FIG. 8(h), the deviation of the glide path is +0.1 degrees, resulting in a geometric symbol that is seven-sixteenths red.

In FIG. 8(i), the deviation of the glide path is +0.0 degrees, resulting in a geometric symbol that is eight-sixteenths red, i.e., one-half red. In this configuration, an equal presentation of colors occurs in a single geometric symbol (i.e., equal red and white colors) is indicative of an aircraft that is on (or near) the DGP.

In FIG. 8(j), the deviation of the glide path is −0.1 degrees, resulting in a geometric symbol that is nine-sixteenths red.

In FIG. 8(k), the deviation of the glide path is −0.2 degrees, resulting in a geometric symbol that is ten-sixteenths red, i.e., five-eighths red.

In FIG. 8(l), the deviation of the glide path is −0.3 degrees, resulting in a geometric symbol that is eleven-sixteenths red.

In FIG. 8(m), the deviation of the glide path is −0.4 degrees, resulting in a geometric symbol that is twelve-sixteenths red, i.e., three-quarters red.

In FIG. 8(n), the deviation of the glide path is −0.5 degrees, resulting in a geometric symbol that is thirteen-sixteenths red.

In FIG. 8(o), the deviation of the glide path is −0.6 degrees, resulting in a geometric symbol that is fourteen-sixteenths red, i.e., seven-eighths red.

In FIG. 8(p), the deviation of the glide path is −0.7 degrees, resulting in a geometric symbol that is fifteen-sixteenths red.

In FIG. 8(q), the deviation of the glide path is −0.8 degrees, resulting in a geometric symbol that is completely red.

From the preceding discussion of this configuration of the DGPDI, there will be a progressive growth in the presence of a red "tape" for an aircraft descending through the DGP from a deviation of +0.8 degrees to a deviation of −0.8 degrees; likewise, there will be a progressive subsidence in the presence of a red "tape" for an aircraft climbing through the DGP from a deviation of −0.8 degrees to a deviation of +0.8 degrees.

Figure 9:
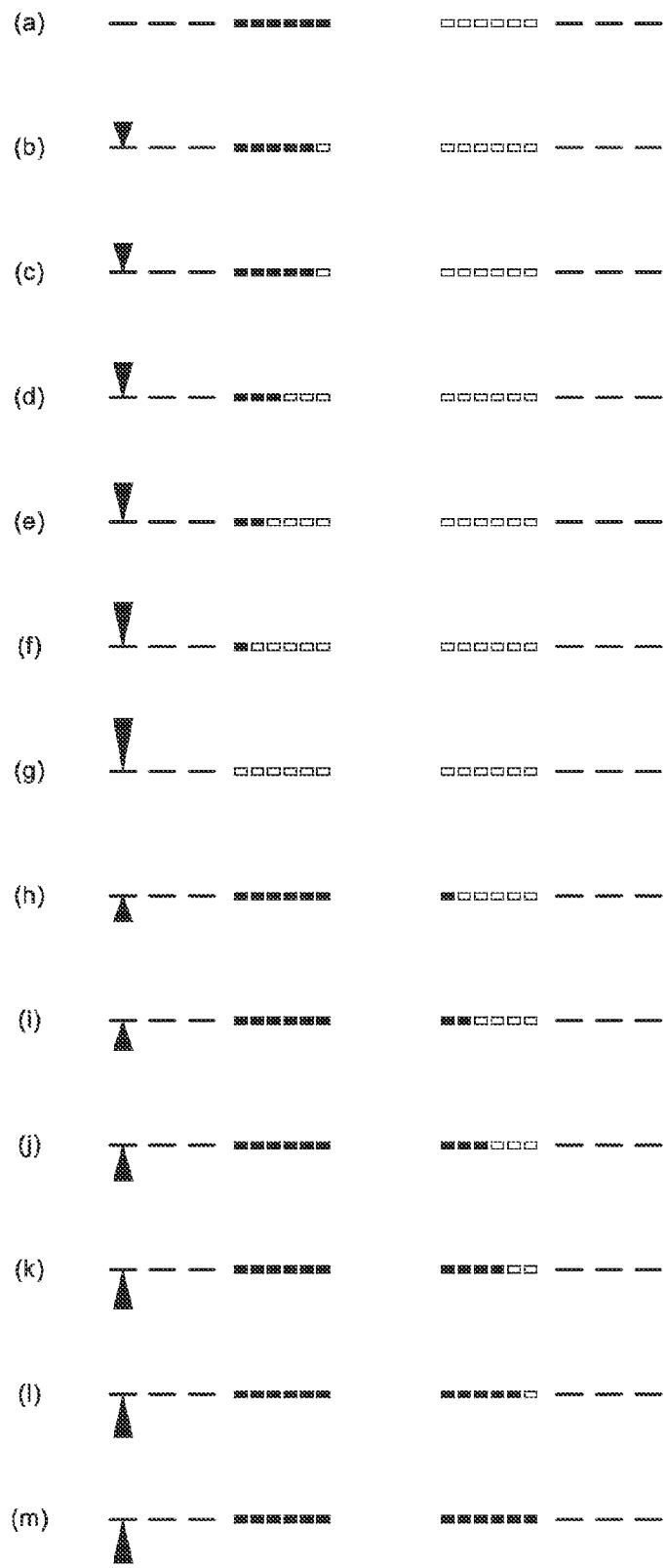
FIG. 9 depicts thirteen indications of a fourth exemplary configuration of a GPARC.

Referring to the drawings of FIG. 9, it will be assumed that a manufacturer and/or end-user has configured the DGPDI as a pattern of geometric symbols and a plurality of second geometric symbols, that is, a pattern of twelve rectangles lined up in a row and six lines aligned with the row of the pattern. For the drawings of FIG. 9, the manufacturer and/or end-user has configured the DGPDI to produce thirteen different indications of glide path deviations, ranging from +1.2 degrees to −1.2 degrees, inclusive. In addition, the DGPDI is further configured with a variably-sized, directional pointer. Although the directional pointer is shown as a solid triangle, the directional pointer could be comprised of a hallow triangle; moreover, a manufacturer and/or end-user could configured such directional pointer in any shape and/or color which conveys to the pilot the direction to the DGP. Although the directional pointer is shown as a solid It should be noted that the number of indications and the range has been selected for the purpose of illustration only and not of limitation.

Referring to FIG. 9(a), the deviation of the glide path of aircraft is 0.0 degrees, resulting in six red geometric symbols and six white. In this configuration, an equal number of white and red geometric symbols and/or an absence of a directional pointer is indicative of an aircraft that is on (or near) the DGP.

In FIG. 9(b), the deviation of the glide path from the DGS is +0.2 degrees; as such, five of the twelve geometric symbols are red and the other seven are white. In addition, a relatively small directional pointer is pointing downward, indicating the direction to and a relative measurement of the deviation from the DGP.

In FIG. 9(c), the deviation of the glide path is +0.4 degrees, resulting in four red geometric symbols and eight white. In addition, the downwardly-pointing directional pointer has increased in size from FIG. 9(b), informing the pilot of a widening deviation from the DGP.

In FIG. 9(d), the deviation of the glide path is +0.6 degrees, resulting in three red geometric symbols and nine white. In addition, the downwardly-pointing directional pointer has increased in size from FIG. 9(c), informing the pilot of a further widening deviation from the DGP.

In FIG. 9(e), the deviation of the glide path is +0.8 degrees, resulting in two red geometric symbols and ten white. In addition, the downwardly-pointing directional pointer has increased in size from FIG. 9(d), informing the pilot of a further widening deviation from the DGP.

In FIG. 9(f), the deviation of the glide path is +1.0 degrees, resulting in one red geometric symbol and eleven white. In addition, the downwardly-pointing directional pointer has increased in size from FIG. 9(e), informing the pilot of a further widening deviation from the DGP.

In FIG. 9(g), the deviation of the glide path is +1.2 degrees, resulting in twelve white geometric symbols. In addition, the downwardly-pointing directional pointer has increased in size from FIG. 9(f), informing the pilot of a further widening deviation from the DGP.

In FIG. 9(h), the deviation of the glide path is −0.2 degrees, resulting in seven red geometric symbols and five white. In addition, a relatively small directional pointer is pointing upward, indicating the direction to and a relative measurement of the deviation from the DGP.

In FIG. 9(i), the deviation of the glide path is −0.4 degrees, resulting in eight red geometric symbols and four white. In addition, the upwardly-pointing directional pointer has increased in size from FIG. 9(h), informing the pilot of a widening deviation from the DGP.

In FIG. 9(j), the deviation of the glide path is −0.6 degrees, resulting in nine red geometric symbols and three white. In addition, the upwardly-pointing directional pointer has increased in size from FIG. 9(i), informing the pilot of a widening deviation from the DGP.

In FIG. 9(k), the deviation of the glide path is −0.8 degrees, resulting in ten red geometric symbols and two white. In addition, the upwardly-pointing directional pointer has increased in size from FIG. 9(j), informing the pilot of a widening deviation from the DGP.

In FIG. 9(l), the deviation of the glide path is −1.0 degrees, resulting in eleven red geometric symbols and one white. In addition, the upwardly-pointing directional pointer has increased in size from FIG. 9(k), informing the pilot of a widening deviation from the DGP.

In FIG. 9(m), the deviation of the glide path is −1.2 degrees, resulting in twelve red geometric symbols. In addition, the upwardly-pointing directional pointer has increased in size from FIG. 9(l), informing the pilot of a widening deviation from the DGP.

From the preceding discussion of this configuration of the DGPDI, there will be a sequential growth in the presence of red "lights" for an aircraft descending through the DGP from a deviation of +1.2 degrees to a deviation of −1.2 degrees; in addition, there will be progressive decrease in the size of the pointer in between and proportional to the deviation of +1.2 degrees and the DGP, a reversal of the direction of the pointer as the aircraft passes through the DGP, and a progressive increase in the size of the pointer in between and proportional to the DGP and the deviation of −1.2 degrees. Likewise, there will be a sequential subsidence in the presence of red "lights" for an aircraft climbing through the DGP from a deviation of −1.2 degrees to a deviation of +1.2 degrees; in addition, there will be progressive decrease in the size of the pointer in between and proportional to the deviation of −1.2 degrees and the DGP, a reversal of the direction of the pointer as the aircraft passes through the DGP, and a progressive increase in the size of the pointer in between and proportional to the DGP and the deviation of +1.2 degrees.

Referring to FIGS. 10A through 10D, it will be assumed that a manufacturer and/or end-user have configured the DGPDI as a pattern of geometric symbols and a plurality of second geometric symbols, where the pattern is comprised of a landing aid symbol of the two-bar Visual Approach Slope Indicator ("VASI") of four lights. In one configuration, the pattern of geometric symbols may present the conventional indications of an actual VASI. That is, two red bars over two white bars may be presented when the aircraft is on the DGP (as shown in FIG. 10A), four white bars when the aircraft is above the DGP, and four red bars when the aircraft is below the DGP, where the amount of deviation above and below the DGP triggering the change of colors may be configurable by a manufacturer and/or end-user.

In another configuration, the pattern of geometric symbols may present the conventional indications of an actual VASI when the aircraft is on and/or slightly below or above the DGP but unconventional indications when the aircraft is not. As shown in FIG. 10B, an aircraft that has exceeded a triggering amount of deviation may result in an unconventional increase in size of the geometric symbols (i.e., bars). As shown in FIGS. 10C and 10D, an aircraft that has exceeded a triggering amount of deviation may result in an unconditional flashing of red lights, where the speed at which the flashing occurs may increase in proportion to the amount of deviation. It should be noted that the use of flashing lights may be a more desirable configuration for the DGPDI that is presented on a HUD because of the monochrome nature of a HUD image.

Referring to FIGS. 11A through 11D, it will be assumed that a manufacturer and/or end-user have configured the DGPDI as a pattern of geometric symbols and a plurality of second geometric symbols, where the pattern is comprised of a landing aid symbol of the three-bar VASI of six lights. In one configuration, the pattern of geometric symbols may present the conventional indications of an actual VASI in the same manner discussed above for the two-bar VASI.

In another configuration, the pattern of geometric symbols may present the conventional indications of an actual VASI when the aircraft is on and/or slightly below or above the DGP but unconventional indications when the aircraft is not. As shown in FIG. 11B, an aircraft that has exceeded a triggering amount of deviation may result in an unconventional increase in size of the geometric symbols (i.e., bars). As shown in FIGS. 11C and 11D, an aircraft that has exceeded a triggering amount of deviation may result in an unconditional flashing of red lights.

Referring to FIGS. 12A through 12D, it will be assumed that a manufacturer and/or end-user have configured the DGPDI as a pattern of geometric symbols and a plurality of second geometric symbols, where the pattern is comprised of a landing aid symbol of the Precision Approach Path Indicator ("PAPI"). In one configuration, the pattern of geometric symbols may present the conventional indications of an actual PAPI in the same manner discussed above for the two-bar VASI.

In another configuration, the pattern of geometric symbols may present the conventional indications of an actual PAPI when the aircraft is on and/or slightly below or above the DGP but unconventional indications when the aircraft is not. As shown in FIG. 12B, an aircraft that has exceeded a triggering amount of deviation may result in an unconventional increase in size of the geometric symbols (i.e., bars). As shown in FIGS. 12C and 12D, an aircraft that has exceeded a triggering amount of deviation may result in an unconditional flashing of red lights.

Figure 13:
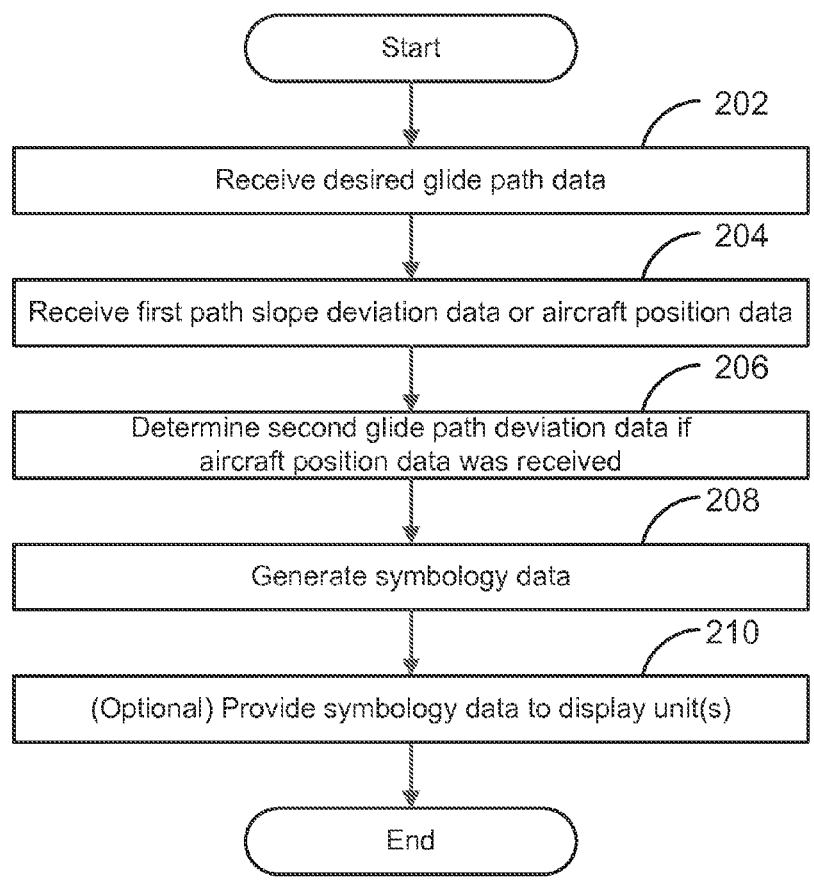
FIG. 13 depicts a flowchart of a method for generating a GPARC.

FIG. 13 depicts flowchart 200 disclosing an example of a method for generating the GPARC, where the SG 140 may be programmed or configured with instructions corresponding to the following modules embodied in flowchart 200. As embodied herein, the SG 140 may be a processor or a combination of processors found in the navigation data source 110, the object data source 130, the reference point data source 135, and/or the user system 150. Also, the SG 140 may be a processor of a module such as, but not limited to, a printed circuit card having one or more input interfaces to facilitate the two-way data communications of the SG 140, i.e., the receiving and providing of data. As necessary for the accomplishment of the following modules embodied in flowchart 200, the receiving of data is synonymous and/or interchangeable with the retrieving of data, and the providing of data is synonymous and/or interchangeable with the making available or supplying of data.

The flowchart begins with module 202 with the receiving of first data from a source of first data, where the first data could be representative of a DGP. The data representative of the DGP could be comprised of the locations and elevations of at least two waypoints of a desired flight path from which a desired glide path may be determined. In one embodiment, the source of first data could be comprised of a processor configured to generate procedure data representative of an approach procedure comprised of a flight path. One such processor is the processor disclosed by Barber, where the procedure data has been generated with a permissible penetration of the OCS and is comprised of the locations and altitudes of two waypoints, the DGP could be represented by these two waypoints. As embodied herein, the SG 140 may be programmed to generate the procedure data. In another embodiment, the source of first data could be comprised of the FMS or the FMS database on the navigation data source 110. In an alternative embodiment, the DGP may be manually set by a pilot through any manual input device known to those skilled in the art.

The flowchart continues with module 204 with the receiving of second data or third data from a source of second data or a source of third data. In an additional embodiment, both the second data and the third data may be received.

The source of second data could be a system on the aircraft from which first glide path deviation information is derived by the system, where such deviation information could be comprised of angular deviation. The second data could be comprised of first glide path deviation information such as, but not limited to, a measurement of angular deviation from the glide path of an instrument approach procedure designed to provide vertical guidance that has been derived by a unit of an avionics system installed in the aircraft. For example, one unit could be an ILS receiver, and the first glide path deviation information could be comprised of the aircraft's deviation from an ILS glide path as determined by the ILS receiver. The source of third data could be comprised of any source that provides aircraft position information such aircraft latitude, longitude, and altitude. One such source is the navigation data source 110.

The flowchart continues with module 206 with the determining of second glide path deviation if the third data is received from the source of third data, where such deviation information could be comprised of angular deviation. Indicative of a measurement of angular deviation from the glide path, second glide path deviation may be determined as a function of the DGP and the aircraft position by one or more algorithms known to those skilled in the art.

In the additional embodiment in which both the second data and the third data are received, the second glide path deviation may be determined as a function of the DGP and the aircraft position by one or more algorithms known to those skilled in the art.

The flowchart continues with module 208 with the generation of symbology data representative of a GPARC comprised of a DGPDI. In one embodiment, the GPARC may be placed on the pitch scale of an attitude indicator. In another embodiment, the GPARC could replace a glide slope "needle" on an indicator (e.g., ILS indicator) used to present vertical guidance information in which the needle swings or slides "up" or "down" from a centered position to indicate deviation from a desired glide slope or desired glide path. If so, the placement on the indicator could be fixed and independent of the DGP. The symbology data may be generated as a function of the DGP and either the first glide path deviation or the second glide path deviation. In the additional embodiment in which both the second data and the third data are received, the symbology data may be generated as a function of the DGP and a blend of first glide path deviation and the second glide path deviation; the use of blending algorithm(s) is known to those skilled in the art.

The DGPDI may be comprised of a pattern of a plurality of first geometric symbols or a single first geometric symbol, where the visual appearance of the pattern or single first geometric symbol may be dependent upon and indicative of the first glide path deviation or the second glide path deviation (or a blend of the first glide path deviation and the second glide path deviation, if applicable). As discussed above, the pattern may be comprised of a row of more than two first geometric symbols. In an alternative pattern, the pattern may be comprised of a row of two first symbols. In another embodiment, the DGP may be further comprised of a plurality of second geometric symbols.

In another embodiment, the DGPDI may be further comprised of a variably-sized, directional pointer. The direction to which the pointer points may be dependent upon a relative position of the aircraft to the DGP, and/or the size of the pointer may be proportional to the deviation.

In another embodiment in which the DGPDI is further comprised of a plurality of second geometric symbols, the pattern may be comprised of an airport lighting aid symbol such as either one form of a VASI or a PAPI. In such embodiment, the visual appearance of the pattern follows the conventional appearance of the airport lighting aid. Alternatively, the visual appearance of the pattern may be dependent upon the relative position of the aircraft to the DGP, where the visual appearance follows the conventional appearance of the airport lighting aid when the aircraft is on and/or slightly below or above the DGP and a non-conventional appearance when it is not.

In an optional embodiment, the symbology data may be provided to the display units 180 configured to receive the symbology data and present the GPARC comprised of the DGPDI on the display unit. The symbology data may be presented on the display unit and superimposed against an image represented in image data generated by an EFVS, an EVS, an SVS, and a CVS. Then, the flowchart proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A device for generating glide path information, such device comprising:
   a symbology generator configured to:
     receive first data representative of a desired glide path;
     receive second data or third data, where
       the second data is representative of a first deviation of an aircraft from the desired glide path, and
       the third data is representative of aircraft position;
     determine a second deviation of the aircraft from the desired glide path if the second data is not received, where
       the second deviation is determined as a function of the desired glide path and the aircraft position; and
     generate symbology data as a function of
       the desired glide path, and
       either the first deviation or the second deviation, such that
         the symbology data is representative of a glide path information symbol
           comprised of a center, a left half, and a right half, positioned symmetrically about a vertical axis dividing an indicator into a left half and a right half, configured to present a plurality of visual appearances, and presented as at least one geometric shape, where the center of the glide path information symbol coincides with the vertical axis, the left half of the glide path information symbol is presented within the left half of the indicator, the right half of the glide path information symbol is presented within the right half of the indicator, the position of the glide path information symbol within the indicator is dependent upon neither the first deviation nor the second deviation, and the visual appearance presented by the glide path information symbol is dependent upon either the first deviation or the second deviation.

2. The device of claim 1, wherein a source of first data is comprised of a processor configured to generate procedure data representative of at least the desired glide path, a source of navigation data, or a manual input device.

3. The device of claim 2, wherein the processor is comprised of the symbology generator.

4. The device of claim 1, wherein a source of second data is comprised of a unit of an avionics system employed during an instrument approach procedure providing vertical guidance, the third data is comprised of a source of navigation data, or both.

5. The device of claim 4, wherein the unit is an instrument landing system receiver.

6. The device of claim 1, wherein the glide path information symbol is presented as two geometric shapes, or each geometric shape is presented in a pattern of geometric shapes.

7. The device of claim 6, wherein the glide path information symbol is further presented as a plurality of second geometric shapes.

8. The device of claim 7, wherein the glide path information symbol is further presented with a variably-sized, directional pointer, where the size of the directional pointer is dependent upon either the first deviation or the second deviation.

9. The device of claim 6, wherein the pattern is comprised of a pattern employed by an airport landing aid.

10. The device of claim 1, wherein the indicator is an attitude indicator comprised of a pitch scale, where the vertical axis is centered on the pitch scale.

11. The device of claim 1, wherein both the second data and the third data are received, and the symbology data is generated as a function of a blend of the first deviation and the second deviation, where the second deviation is determined after the second data and the third data are received, and the visual appearance presented by the glide path information symbol is dependent upon both the first deviation and the second deviation.

12. A method for generating glide path information, such method comprising:

receiving first data representative of a desired glide path;

receiving second data or third data, where the second data is representative of a first deviation of an aircraft from the desired glide path, and the third data is representative of aircraft position;

determining a second deviation of the aircraft from the desired glide path if the second data is not received, where the second deviation is determined as a function of the desired glide path and the aircraft position; and generating symbology data as a function of the desired glide path, and either the first deviation or the second deviation, such that the symbology data is representative of a glide path information symbol comprised of a center, a left half, and a right half, positioned symmetrically about a vertical axis dividing an indicator into a left half and a right half, configured to present a plurality of visual appearances, and presented as at least one geometric shape, where the center of the glide path information symbol coincides with the vertical axis, the left half of the glide path information symbol is presented within the left half of the indicator, the right half of the glide path information symbol is presented within the right half of the indicator, the position of the glide path information symbol within the indicator is dependent upon neither the first deviation nor the second deviation, and the visual appearance presented by the glide path information symbol is dependent upon either the first deviation or the second deviation.

13. The method of claim 12, wherein the glide path information symbol is presented as two geometric shapes, or each geometric shape is presented in a pattern of geometric shapes.

14. The method of claim 13, wherein the glide path information symbol is further presented as a plurality of second geometric shapes.

15. The method of claim 14, wherein the glide path information symbol is further presented with a variably-sized, directional pointer, where the size of the directional pointer is dependent upon either the first deviation or the second deviation.

16. The method of claim 13, wherein the pattern is comprised of a pattern employed by an airport landing aid.

17. The method of claim 12, wherein the indicator is an attitude indicator comprised of a pitch scale, where the vertical axis is centered on the pitch scale.

18. The method of claim 12, wherein both the second data and the third data are received, and the symbology data is generated as a function of a blend of the first deviation and the second deviation, where the second deviation is determined after the second data and the third data are received, and the visual appearance presented by the glide path information symbol is dependent upon both the first deviation and the second deviation.

19. A method for presenting glide path symbology, such method comprising:

receiving symbology data representative of a glide path information symbol comprised of a center, a left half, and a right half, positioned symmetrically about a vertical axis dividing an indicator into a left half and a right half, configured to present a plurality of visual appearances, and presented as at least one geometric shape, where the center of the glide path information symbol coincides with the vertical axis, the left half of the glide path information symbol is presented within the left half of the indicator, the right half of the glide path information symbol is presented within the right half of the indicator, the position of the glide path information symbol within the indicator is dependent upon neither a first deviation from a desired glide path nor a second deviation from the desired glide path, and the visual appearance presented by the glide path information symbol is dependent upon either the first deviation or the second deviation; and presenting the glide path information symbol to at least one viewer.

20. The method of claim 19, wherein the glide path information symbol is presented as two geometric shapes, or each geometric shape is presented in a pattern of geometric shapes.

21. The method of claim 20, wherein the glide path information symbol is further presented as a plurality of second geometric shapes.

22. The method of claim 21, wherein the glide path information symbol is further presented with a variably-sized, directional pointer, where the size of the directional pointer is dependent upon either the first deviation or the second deviation.

23. The method of claim 19, wherein the pattern is comprised of a pattern employed by an airport landing aid.

24. The method of claim 19, wherein the indicator is an attitude indicator comprised of a pitch scale, where the vertical axis is centered on the pitch scale.

* * * * *